US008732164B1

(12) United States Patent
Dellovo

(10) Patent No.: US 8,732,164 B1
(45) Date of Patent: *May 20, 2014

(54) APPARATUSES, SYSTEMS AND METHODS FOR DATA ENTRY CORRELATION

(75) Inventor: David Dellovo, North Andover, MA (US)

(73) Assignee: Monster Worldwide, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/450,207

(22) Filed: Apr. 18, 2012

Related U.S. Application Data

(63) Continuation of application No. 11/614,845, filed on Dec. 21, 2006, now Pat. No. 8,195,657, and a continuation-in-part of application No. 11/383,412, filed on May 15, 2006.

(60) Provisional application No. 60/757,781, filed on Jan. 9, 2006.

(51) Int. Cl.
*G06F 7/00* (2006.01)
*G06F 17/30* (2006.01)

(52) U.S. Cl.
USPC .......................................... 707/722; 705/320

(58) Field of Classification Search
USPC ........................................................ 707/722
See application file for complete search history.

(56) References Cited

U.S. PATENT DOCUMENTS

| | | | |
|---|---|---|---|
| 6,523,037 B1 | 2/2003 | Monahan et al. | |
| 6,757,691 B1 | 6/2004 | Welsh et al. | |
| 2001/0034630 A1 | 10/2001 | Mayer et al. | |
| 2002/0026452 A1 | 2/2002 | Baumgarten et al. | |
| 2002/0045154 A1* | 4/2002 | Wood et al. | 434/350 |
| 2002/0046074 A1 | 4/2002 | Barton | |
| 2002/0055870 A1* | 5/2002 | Thomas | 705/10 |
| 2002/0059201 A1* | 5/2002 | Work | 707/3 |
| 2002/0072946 A1 | 6/2002 | Richardson | |
| 2002/0124184 A1 | 9/2002 | Fichadia et al. | |
| 2002/0133369 A1* | 9/2002 | Johnson | 705/1 |
| 2002/0161602 A1 | 10/2002 | Dougherty et al. | |
| 2003/0065805 A1 | 4/2003 | Barnes, Jr. | |
| 2003/0071852 A1 | 4/2003 | Stimac | |
| 2004/0015371 A1 | 1/2004 | Thomas et al. | |
| 2004/0030566 A1 | 2/2004 | Brooks Rix | |

(Continued)

OTHER PUBLICATIONS

"Commsland: Contractors cut out the middleman." M2 Presswire. Coventry: Nov. 5, 2002, p. 1.

(Continued)

*Primary Examiner* — Robert Beausoliel, Jr.
*Assistant Examiner* — Nicholas Allen
(74) *Attorney, Agent, or Firm* — Nathan W. Poulsen; Jiaping (Charlene) Liu; Dagim Tilahun

(57) ABSTRACT

This disclosure details the implementation of systems, methods and apparatuses for providing an integrated process tracking and management. The disclosure provides solutions for initiating, tracking, correlating and managing complex processes. In particular, the disclosure provides systems, methods and apparatuses for process tracking and management particularly suited to job listing matching and management. In an implementation, the system may be configured to receive and extract base data entry metrics from a user designated input, for example a user's resume or a user designated saved job listing. The base data entry metrics may be correlated with user correlation metrics to derive search parameters for identifying supplemental data entries for a particular user.

24 Claims, 23 Drawing Sheets

(56) References Cited

U.S. PATENT DOCUMENTS

| | | | |
|---|---|---|---|
| 2004/0039601 A1 | 2/2004 | Anderson | |
| 2004/0148220 A1* | 7/2004 | Freeman et al. | 705/11 |
| 2004/0236598 A1* | 11/2004 | Thomsen | 705/1 |
| 2005/0096973 A1* | 5/2005 | Heyse et al. | 705/11 |
| 2005/0154701 A1* | 7/2005 | Parunak et al. | 707/1 |
| 2005/0177408 A1 | 8/2005 | Miller | |
| 2005/0216295 A1* | 9/2005 | Abrahamsohn | 705/1 |
| 2006/0229896 A1* | 10/2006 | Rosen et al. | 705/1 |
| 2006/0235884 A1 | 10/2006 | Pfenninger | |
| 2006/0265267 A1* | 11/2006 | Chen et al. | 705/9 |
| 2007/0038636 A1 | 2/2007 | Zanghi et al. | |
| 2007/0054248 A1* | 3/2007 | Bare | 434/219 |
| 2007/0218434 A1* | 9/2007 | Habichler et al. | 434/219 |

OTHER PUBLICATIONS

Hallet, Karen Schreier. "Mastering the expanding Lexis-Nexis academic universe," EContent. Wilton: Oct./Nov. 1999. vol. 22, Iss. 5, p. 47.

Hayes, Heather B. "Hiring on the Fast Track," Federal Computer Week. Falls Church: Jul. 29, 2002. vol. 16, Iss. 26, p. 26.

"Steve Wynn Begins Search for 9,000 Employees for Wynn Las Vegas." PR Newswire. New York: Nov. 8, 2004. p. 4.

"Town talk; [Clipper FR Edition 2]" Virginian—Pilot. Norfolk, VA: Sep. 26, 2004. p. 3.

\* cited by examiner

| Job Title 701 | Company 702 | Location 703 | Date Applied 704 | Corres. 705 | Status 706 | Score 707 |
|---|---|---|---|---|---|---|
| Web Developer | Monster | Maynard, Ma | 1/9/05 | 10 | Offer | 95 |
| Web Developer | Monster | Maynard, Ma | 1/10/05 | 7 | HR Rev. | 95 |
| Web Developer | Monster | Maynard, Ma | 1/12/05 | 3 | 2nd Int. | 95 |
| Web Developer | Monster | Maynard, Ma | 2/15/05 | 2 | Opened | 95 |
| Web Developer | Monster | Maynard, Ma | 3/15/05 | 1 | Received | 95 |
| Web Developer | Monster | Maynard, Ma | ---- | 0 | ---- | 95 |
| Web Developer | Monster | Maynard, Ma | ---- | 0 | ---- | 95 |
| Web Developer | Monster | Maynard, Ma | ---- | 0 | ---- | 95 |
| Web Developer | Monster | Maynard, Ma | ---- | 0 | ---- | 95 |
| Web Developer | Monster | Maynard, Ma | ---- | 0 | ---- | 95 |

FIG. 7A

| User Rating | Job Title | Company | Location | Date Applied | Corres. | Status | Score |
|---|---|---|---|---|---|---|---|
| ★★★★★ | Web Developer | Monster | Maynard, Ma | 1/9/05 | 10 | Offer | 95 |
| ★★★★☆ | Web Developer | Monster | Maynard, Ma | 1/10/05 | 7 | HR Rev. | 95 |
| ★★★★☆ | Web Developer | Monster | Maynard, Ma | 1/12/05 | 3 | 2nd Int. | 95 |
| ★★★☆☆ | Web Developer | Monster | Maynard, Ma | 2/15/05 | 2 | Opened | 95 |
| ★★★☆☆ | Web Developer | Monster | Maynard, Ma | 3/15/05 | 1 | Received | 95 |
| ★★☆☆☆ | Web Developer | Monster | Maynard, Ma | --- | 0 | --- | 95 |
| ★★☆☆☆ | Web Developer | Monster | Maynard, Ma | --- | 0 | --- | 95 |
| ★★☆☆☆ | Web Developer | Monster | Maynard, Ma | --- | 0 | --- | 95 |
| ★☆☆☆☆ | Web Developer | Monster | Maynard, Ma | --- | 0 | --- | 95 |
| ★☆☆☆☆ | Web Developer | Monster | Maynard, Ma | --- | 0 | --- | 95 |

APPARATUSES, SYSTEMS AND METHODS FOR DATA ENTRY CORRELATION

RELATED APPLICATIONS

This application is a Continuation of and claims priority under 35 U.S.C. §120 to non-provisional patent application Ser. No. 11/614,845, filed Dec. 21, 2006 and entitled "Apparatuses, Systems and Methods for Data Entry Correlation," which in turn is a Continuation-in-Part of non-provisional patent application "Job Application Tracking System," Ser. No. 11/383,412, filed May 15, 2006 and priority is claimed to the application under 35 U.S.C. §120. This application also claims all rights of priority under 35 U.S.C. §119 to provisional patent Application "Job Application Tracking System," Ser. No. 60/757,781, filed Jan. 9, 2006. Application titled, "Apparatuses Systems and Method for Application Submission Tracking and Management," Ser. No. 11/614,929, filed Dec. 21, 2006 is a co-pending related application. Each of these applications are hereby incorporated by reference.

FIELD

The present disclosure relates generally to data correlation. In particular, the present application provides apparatuses, systems, and methods suited to job application tracking and identifying jobs matching the interests and abilities of an applicant.

BACKGROUND

Complex processes involving numerous steps, voluminous information and multiple parties are often difficult for users to visualize, monitor, correlate, initiate and manage. Individuals are often forced to develop ad hoc systems to manage processes, with varying degrees of success. This problem is particularly acute in situations where the processes are highly information-intensive and involve multiple data sources. As such, it is often a challenging proposition for an individual to simply manage their own data, let alone derive meaningful search criteria from the data or correlate additional data entries based on their data.

SUMMARY

One situation where users are faced with the problem of managing information intensive processes is searching for a new job. Job search is a particularly difficult process for individuals to manage because it is not done very often, it requires interaction with various different systems, and in order to be successful there is little tolerance for error.

Job applicants typically search numerous job listings from any number of job search web sites, classified ads, and employer web sites. The jobs listings discovered in these searches would most likely each have their own application procedures and feedback processes. The searches will also often result in the applicant encountering many jobs not suited to the applicant as well as the same job listing in multiple locations. To effectively and efficiently conduct their job search, applicants must recognize duplicate job listings, manage the various application processes, and receive and respond to application feedback.

In addition to identifying multiple listings to avoid duplicative submissions, it is also advantageous to know about duplicate listings of a single job because the information provided by the various listing sites might differ. For example, one site listing the job might provide information indicating that the position has been filled before the other sites.

After the applicant has collected different relevant job listings, the applicant must evaluate the different jobs to determine which best fit the applicant's interests and abilities as well as identify which are the most desirable. As the number of job listings increases managing this evaluation becomes more and more difficult.

Beyond merely identifying relevant job listings, job applicants usually decide to apply to one or many of the jobs discovered in their search. The job applicant must then fill out applications and/or provide resumes for the chosen jobs and coordinate the filing of those applications with the prospective employers. Once filed, the job applicant must monitor the status of the various applications. This monitoring may include scheduling interviews, responding to requests for additional information, checking the status of the employer's review of the application, and/or managing outstanding job offers. The provided status information may assist the job applicant in making important decisions. For example, knowing the progress of outstanding applications through the employers' review and selection may help the applicant decide whether to accept a pending offer or wait for a pending decision from another employer.

In some embodiments of the present invention, a system and method are provided for process tracking and management. In one embodiment, a job application tracking and management system comprises an application tracking and management core and an application tracking and management extension that interfaces with a host application and is in communication with the application tracking and management core. The application tracking and management extension provides a user interface that enables the user of the host application to select listings to be saved, apply to a desired listing and find listings matching a set of criteria pertaining to the applicant. The application tracking and management core provides a user interface to review saved and applied for listings, check the status of applied for listings, identify other instances of the listing and find jobs matching the interests and abilities of the applicant.

In another embodiment of the invention, a browser plug-in is provided to enable job hunters to easily search, save, evaluate, and apply to job listings. In one implementation, the plug-in interacts with a host application providing access to a plurality of job listings. For a current job listing displayed on the host application, one embodiment of the plug-in may provide a save control that stores information relating to the current job listing and, in a further embodiment, an apply control that initiates a job application process for the current job listing.

In another embodiment, the plug-in may facilitate matching jobs control that initiates a search for jobs matching or similar to the current job listing. In a further embodiment, the show matching jobs control initiates a search for jobs according to an analysis of the plurality of jobs saved and/or applied to by the applicant. In another embodiment, the browser plug-in also allows the applicant's browsing history to be incorporated into the process of identifying appropriate job listings for the applicant.

In another embodiment, feedback is provided for a pending job application comprising receiving an application along with a feedback generating object; accessing the application; automatically activating the feedback generating object in response to the accessing of the application; generating a feedback message via the feedback object; and transmitting the feedback message.

In another embodiment, jobs relevant to an applicant are identified by retrieving information pertaining to the applicant, including but not limited to the applicant's desired location, income expectations, experience level, educational background, and other attributes and preferences of the applicant. One or more job listing services are searched based on the retrieved information. A plurality of job listings are received from the search and the received job listings are scored based on the retrieved information. Based on their respective scores, one or more job listings are identified for an applicant. In one embodiment, job listings that score over a certain threshold (e.g., 90 out of 100) are identified as being appropriate for an applicant. In some embodiments, information pertaining to the applicant may come from the applicant's resume. In one embodiment, jobs relevant to an applicant are identified by an analysis of the jobs saved and/or applied to by the applicant. In some embodiments, jobs relevant to an applicant are identified by analysis of the applicant's profile, which in one embodiment may include an applicants browsing history.

In another embodiment, a method for obtaining job listing information is provided, comprising obtaining information relating to a job listing in a host application; activating a control to save the contents of the job listing; analyzing the job listing and extracting relevant job information including an employer name, a job location, a job title, an experience requirement, and a job description.

BRIEF DESCRIPTION OF THE FIGURES

FIG. 7A discloses an embodiment of an application history screen in accordance with the present invention.

FIG. 7C discloses a further embodiment of an application history screen in accordance with the present invention.

DETAILED DESCRIPTION

Figure 1A:
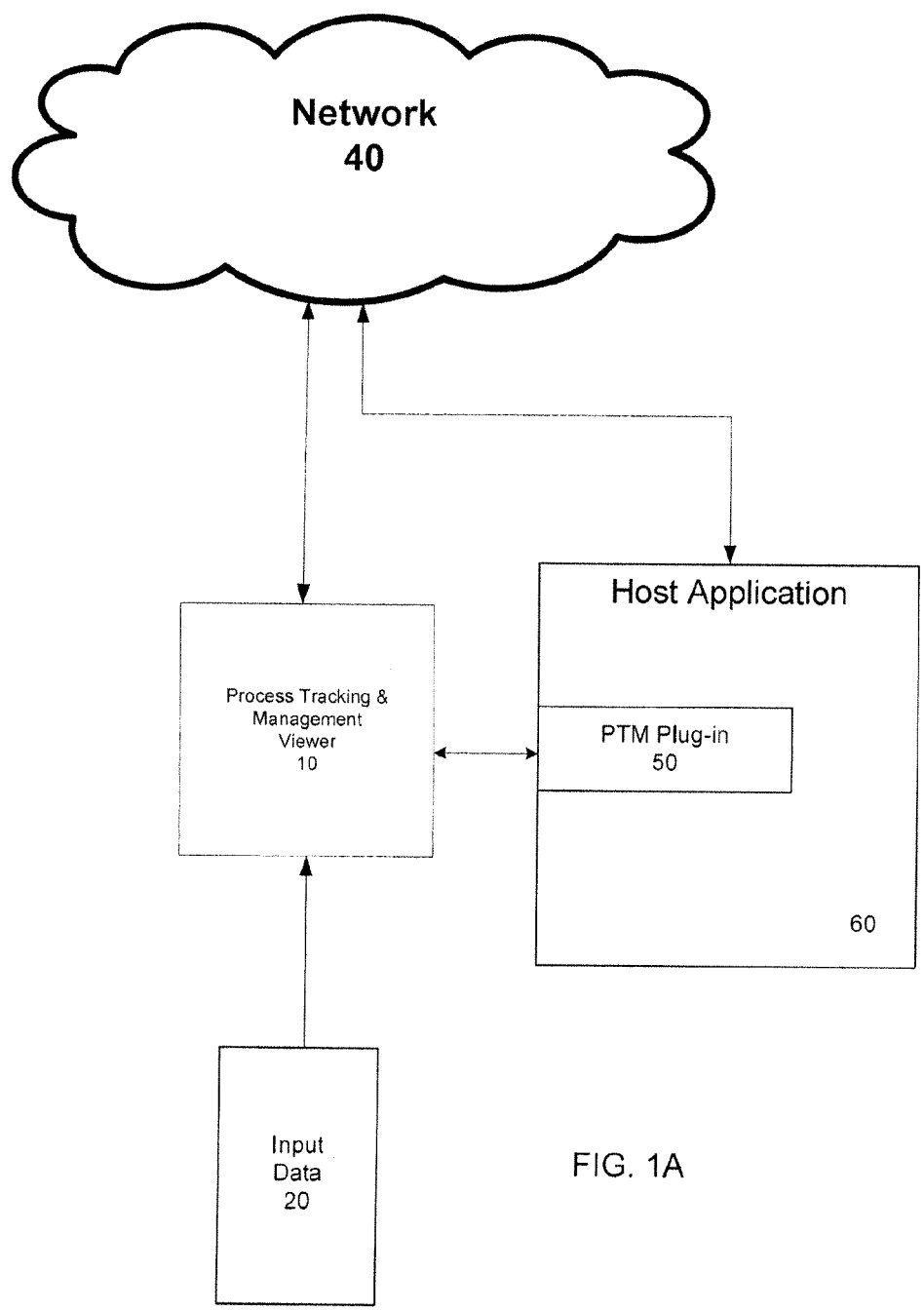
FIG. 1A discloses an embodiment of a process tracking and management environment in accordance with the present invention.

FIG. 1A discloses an embodiment of a process tracking and management environment aspect of the disclosed invention. The Process Tracking And Management Environment enables the applicant to initiate, manage, and monitor processes of interest to the applicant. The main user interface for the Process Tracking And Management Environment is the Process Tracking And Management Viewer 10. The Process Tracking And Management Viewer can be implemented using a variety of software development techniques know in the art. For example, the Process Tracking And Management Viewer can be a stand-alone application, web-based application, or integrated into another piece of software.

The Process Tracking And Management Viewer allows the applicant to access the functions of the Process Tracking And Management Environment, such as integrating input data 20 or conducting process tracking. The Process Tracking And Management Viewer may connect to a network 40 to receive information concerning the processes being tracked, such as a status update for a particular process.

The Process Tracking And Management Viewer also interacts with the Process Tracking And Management Plug-In 50. The Process Tracking And Management Plug-In provides a mechanism for information to be transferred to and from the Process Tracking And Management Viewer. For example, a monitored process might be generated through the use of another application (i.e., a host application) with which the Process Tracking And Management Plug-In is integrated in order to provide added functionality. In this way, when a new process is started in the host application the Process Tracking And Management Plug-In provides a user interface and communications infrastructure to communicate the relevant information about the new process to the Process Tracking And Management Plug-In. The Process Tracking And Management Plug-In can similarly make relevant information from the Process Tracking And Management Viewer, such as the input data, accessible to the host program.

Figure 1B:
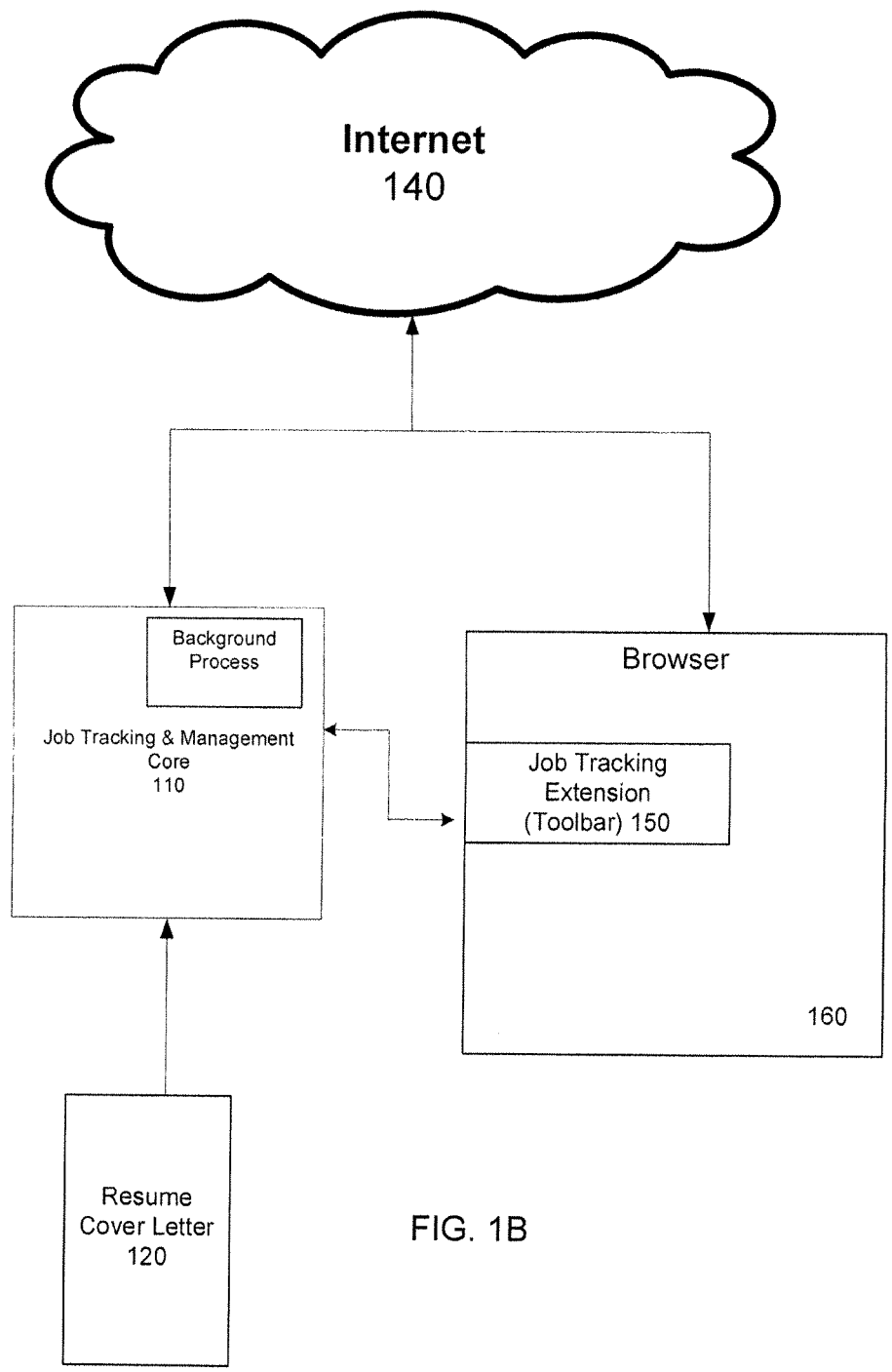
FIG. 1B discloses an embodiment of a job application tracking and management environment in accordance with the present invention.

FIG. 1B depicts an embodiment of the disclosed system specifically used to implement a Job Application Tracking And Management Environment. The Job Application Tracking And Management Environment comprises a Job Tracking And Management Core 110 and a Job Listing Tracking Extension 150. The Job Tracking And Management Core serves as the primary user interface and coordination point for the applicant's use of the Job Application Tracking And Management Environment. The Job Application Tracking And Management Environment can be implemented as a stand-alone application or a web based application. The Job Application Tracking And Management Environment could be implemented using a variety of software development techniques as required by the hardware platform it runs upon, such as, for example, a personal digital assistant, phone, set top box, etc.

An applicant would typically have a unique instance of the Job Application Tracking And Management Environment for his or her use. Typically this might be accomplished by having one local version of the Job Application Tracking And Management Environment on the applicant's personal computer. Applicants might alternately be provided a unique instance of the Job Application Tracking And Management Environment through the use of user accounts with usernames and passwords. The applicant's unique instance of the Job Application Tracking And Management Environment stores relevant personal information about the applicant and his or her job search. In particular, the Job Tracking And Management Core 110, for example, might take as input the applicant's resume and/or cover letter 120. The resume and cover letter can then be made available to aid in filing job applications for the applicant and/or in finding job listings suitable to the interests and abilities of the applicant. The Job Tracking And Management Core would most likely keep a copy of the applicant's resume and cover letter or a symbolic link to its location. In a web application embodiment the resume and cover letter could be up-loaded to the web application's host server.

Once accessed by the Job Tracking And Management Core, the resume and cover letter information can be parsed by the Job Tracking And Management Core to extract relevant information about the applicant, such as, the applicant's name, address, phone number, email address, educational background, title, work history, etc. This parsed information might be presented to the applicant for confirmation and then used by the Job Tracking And Management Core to create a profile associated with the applicant. In a further embodiment, the applicant could be prompted to provide additional information to expand the profile created by the Job Tracking And Management Core. Alternately, elements of the applicant's profile could be entered by hand or imported from some other source. In some embodiments, key terms associated with the applicant may be extracted from a resume during the creation/upload process. The key terms may be used for as search terms in a job matching application that will be described in greater detail below.

In the job application process, information about job listings is likely to be derived from multiple sources, e.g., various job listing services and various employer listings. Typically, these job listings will come to the attention of the applicant through searches on the World Wide Web, or a similar information-gathering environment. The Job Listing Tracking Extension can be embodied by a web browser plug-in, for example, with the web browser acting as the host application for the Job Listing Tracking Extension. Alternately, it could be a separate utility, a network, e.g. web, interface, or an integrated function of the host application.

In the embodiment of FIG. 1B, the Job Listing Tracking Extension 150 integrates with the applicant's browser 160 to provide a mechanism to transfer information to and from the Job Application Tracking And Management Environment and the browser. In order to allow the Job Application Tracking And Management Environment to record and transfer information when the Job Tracking And Management Core 110 is not actively running, a background process 111 may be provided to provide the Job Listing Tracking Extension 150 a connection interface. The background process could be embodied, for example, as a daemon or windows background process. In the alternative, the information used by the system can be stored on a network accessible data storage device that is accessible by both the Job Listing Tracking Extension and the Job Tracking And Management Core. The Job Listing Tracking Extension 150 integrates with its host application browser 160, which connects to the internet 140. One implementation of the Job Listing Tracking Extension 150 may be a web browser toolbar, while an alternative extension embodiment might incorporate menu commands for implementing Job Listing Tracking Extension functions to the host application browser.

Figure 2A:
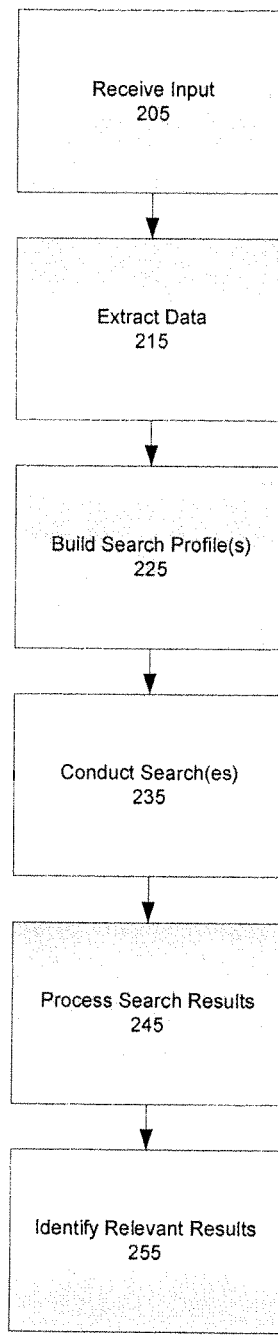
FIG. 2A discloses a flow diagram for a job listing search aspect of one embodiment of the present invention.

FIG. 2A discloses a flow diagram for a job listing search aspect of one embodiment of the present invention. The method disclosed, which in some embodiments is implemented on a processor and executed by the Job Listing Tracking Extension 150 and/or the Job Tracking And Management Core 110, allows for receiving input 205 relevant to a job listing search such as, by way of non-limiting example, location, skill(s) and/or education, experience level and compensation. In some embodiments, the input 205 may come directly from an applicant, such as an applicant's entered job parameters, an applicant's response to job related queries, and/or a submitted resume. In another embodiment, the input 205 could include information not specific to a particular applicant, such as a job description or listing.

Relevant data is extracted 215 from the received input, for example, if the input were a resume, the extraction could include parsing and analyzing the resume to distill the key data relevant to the job listing search. The relevant data is used to build a search profile 225 that may then be utilized, either in whole or in part, in generating and conducting a job listing search or searches 235. The results of the search or searches are processed 245, which in some embodiments may include a further analysis and/or refinement of the search results, and from the processing, relevant results (i.e., a plurality of job listings corresponding to the input 205) are identified 255.

Figure 2B:
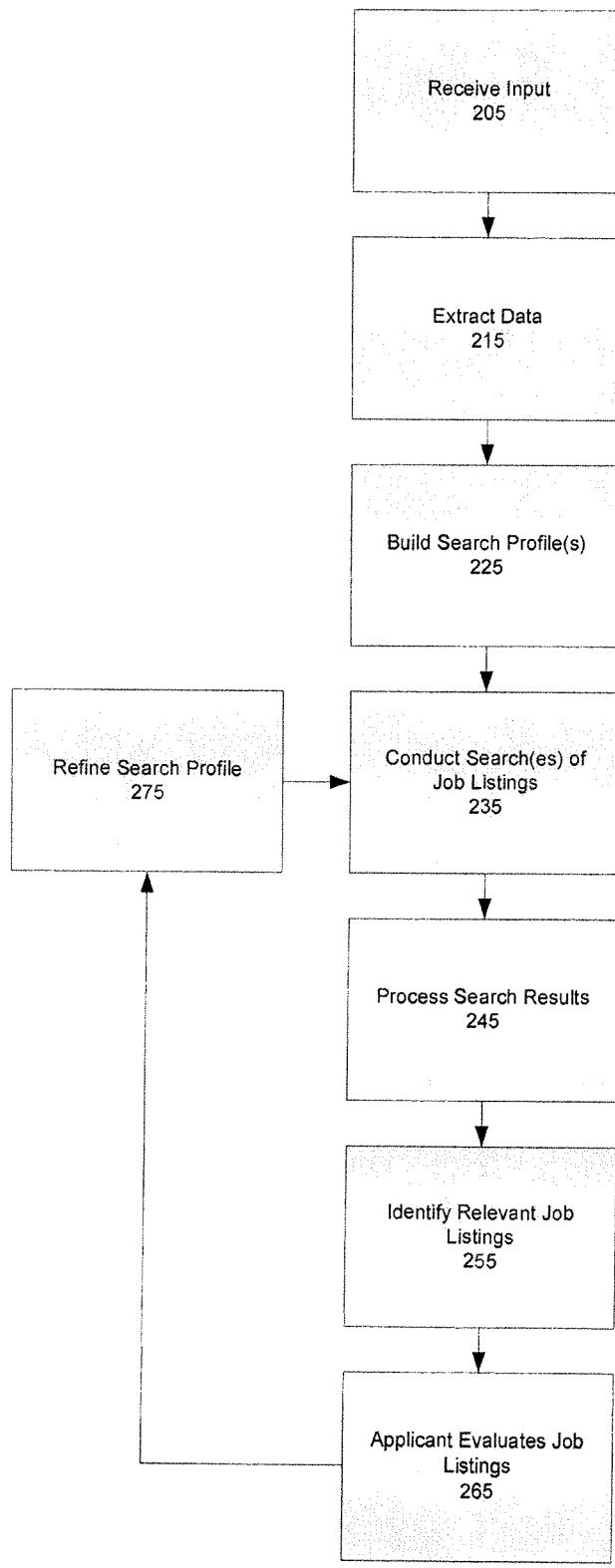
FIG. 2B discloses a flow diagram for a further embodiment of the job listing search aspect of the present invention.

In a further embodiment, shown in FIG. 2B, the above method may be iteratively refined. As in the previous figure, an initial search profile 225 is utilized in conducting job listing searches 235, the results of the searches are processed 245, and relevant job listings are identified 255. The identified job listings are then presented to an applicant who may evaluate 265 the job listings based on any number of user-rating metrics. For example, the user may rate the job listings according to how well suited the listings are to the applicant's employment interests, the listings meet the applicant's qualifications or desired income goals. The applicant's feedback and/or evaluation 265 may then be used to refine the search profile 275, which may be used in place or in addition to the initial search profile 225 in conducting subsequent searches of job listings 235. The above method may be iterated multiple times to further refine the job listings identification of job listings relevant to an applicant.

Figure 3A:
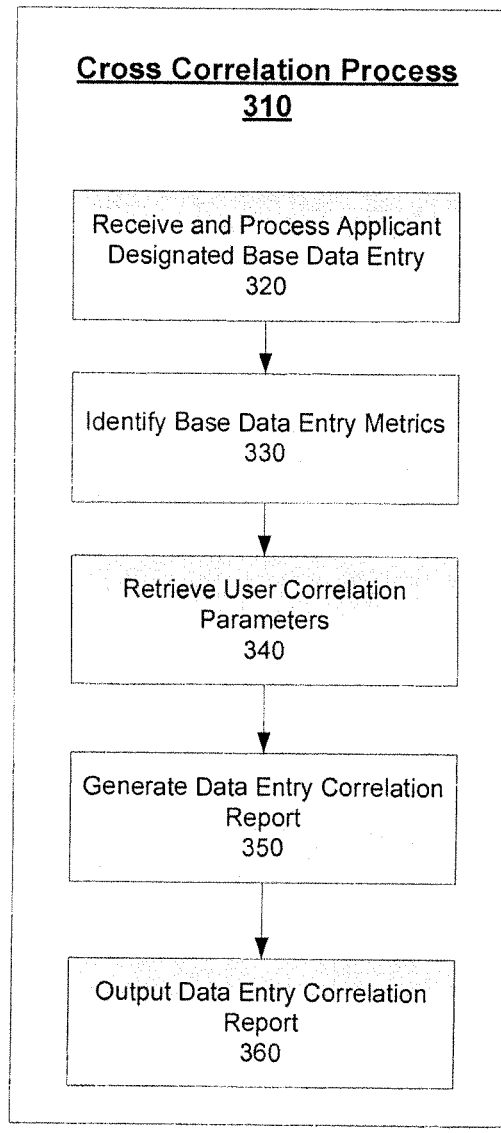
FIG. 3A discloses a flow diagram for a cross correlation search aspect of one embodiment of the present invention.

FIG. 3A discloses a flow diagram for data entry correlation according to an embodiment of the disclosed invention. The method disclosed allows for receiving and processing applicant designated base data entries and correlating the base data entries with supplementary data entries, as well as generating and outputting a data entry correlation report. In some embodiments, the cross correlation process 310 is implemented on a processor by the Job Listing Tracking Extension 150 and/or the Job Tracking And Management Core 110. The data entry correlation report may be utilized in searching and identifying supplemental data entries (e.g., job listings) matching an applicant. An applicant designated base data entry is received and processed 320 to determine base data entry metrics 330. User correlation parameters are retrieved 340 that match the base data entry metrics 330, wherein matching user correlation parameters correspond to the base data entry metrics 330. From the retrieved user correlation parameters 340, a data entry correlation report is generated 350. Some embodiments of the disclosed invention may output the data entry correlation report 360, and in a further embodiment, the data entry correlation report may be associated with the applicant's profile. In some embodiments, user correlation parameters may be retrieved from internal and/or external data bases.

Figure 3B:
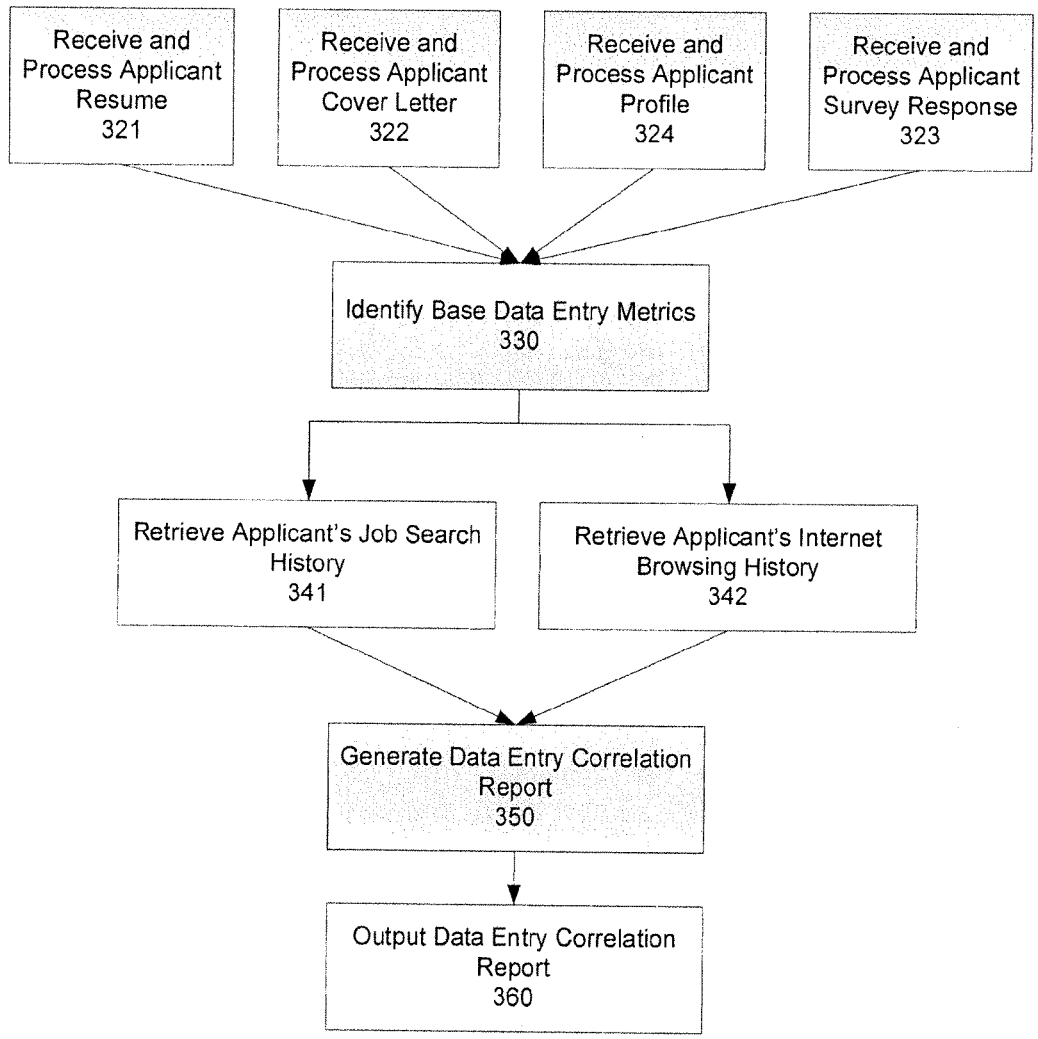
FIG. 3B discloses a flow diagram for the cross correlation search aspect of a particular implementation of the present invention.

In some embodiments, the base data entry and/or user correlation parameters may be direct input, such as an applicant's response(s) to one or more brief and/or in-depth surveys as discussed in FIG. 3B. Survey methodologies may include multiple choice, short answer, rating, ranking, free response and/or the like. In one embodiment, the surveys are directly related to job finding. In a further embodiment, the surveys include additional matter (e.g., personality tests) that, after being analyzed, may be useful in finding job listings that are especially well matched to an applicant.

In one embodiment, the relevant user correlation parameters may include an applicant's historical information. In some embodiments, the historical information may include an applicant's search for job listings, viewing of job listings, responses to job listings, aspects of the applicant's profile, application submission to job listings, and/or saved job listings. In another embodiment, the historical information includes the applicant's web site viewing and/or web search history.

In one implementation, shown in FIG. 3B, the applicant designated base data entry or entries may include an applicant's resume 321, cover letter 322, survey response(s) 323 and/or profile 324. The base data entry or entries are received and processed to extract base data entry metrics 330. User correlation parameters including the applicant's job search history 341 and/or internet/web browsing history 342 are retrieved and correlated with the base data entry metrics 330 and a data entry correlation report is generated 350. In a further embodiment, the Job Listing Tracking Extension and/or the Job Tracking And Management Core utilizes a data entry correlation rating module for an applicant to refine and target searches for job listings matching the applicant.

For example, in one embodiment, the analysis of a particular applicant's base data entry (in this case the applicant's resume) may yield base data entry correlation metrics that correspond to skills, education, work history and other details relevant to software engineering. User correlation metrics corresponding to the applicant (in this case the job search terms used by the applicant on a job listing site, such as job locations searched) are retrieved and correlated to the base data entry metrics and a data entry correlation report is generated. In this case, the metrics may indicate that the applicant has a certain level of experience in software engineering and has previously worked in the southwest (from analysis of the base data entry), but has been searching for jobs in the northwest (from the user correlation parameters). This data entry correlation report may then be utilized to better target and serve the applicant's interest by, for example, providing matching software engineering jobs in the northwest.

In another embodiment, the base data entry may be selected by the applicant, but is not necessarily applicant specific, including but not limited to a job listing. For example, if a job listing is the base data entry, the job listing would be processed to extract the relevant base data entry metrics. In some embodiments, the correlation metrics may include the metrics mentioned above, and may be extracted from the base data entries previously listed (e.g., resumes, cover letters, survey responses, profiles). In one embodiment, the data entry correlation report may be useful in finding job listings similar to the job listing used as the base data entry that are especially well suited to an applicant.

For example, for the case where a job listing is the base data entry, the correlation metrics may be based on the applicant's web or internet browsing history. If the job listing selected is for a general software engineer with C/C++ programming experience, and the applicant's browsing history shows indicates an interest in video game development as well as a particular geographic region, the data entry correlation report would reflect the potential correlation. The data entry correlation metrics could then be used in finding and/or evaluating job listings for the applicant, i.e., a job listing for a video game programmer requiring C++ programming abilities in applicant's geographic region of interest would be identified as being a good match for the applicant.

Figure 3C:
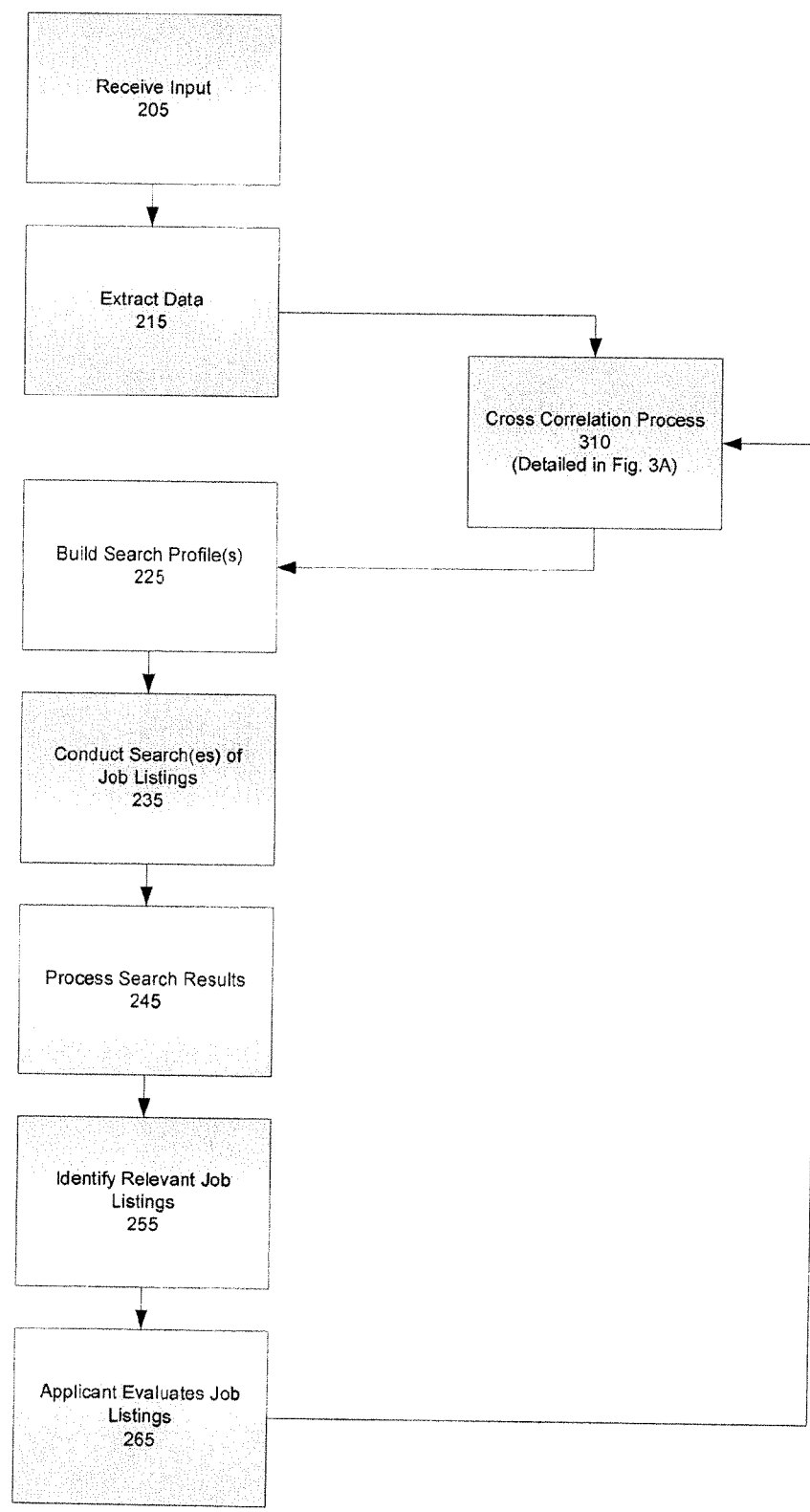
FIG. 3C discloses a flow diagram for a further implementation of the correlation search aspect of the present invention.

FIG. 3C illustrates one embodiment of the disclosed invention in which the cross correlation process 310 is incorporated in the listing search method. As detailed in the above discussions of FIGS. 2A and 2B, the listing search method may receive input 205 relevant to searching job listings and extract relevant data 215 from the received input. The extracted data may then be used as the applicant designated base data entry in the cross correlation process 310 and the resulting data entry correlation report 350 is utilized in constructing the search profiles 225 used to conduct job listing searches 235. As before, the results of the searches are processed 245, relevant job listings are identified 255, and the identified job listings are presented to the applicant for evaluation 265. In some embodiments the applicant's evaluation 265 may be incorporated into the cross correlation process 310 to refine the correlation of the base data entry metrics with the supplemental data entries and in a further embodiment, is process is iterated to progressively enhance cross correlation and the job listing search.

Figure 4A:
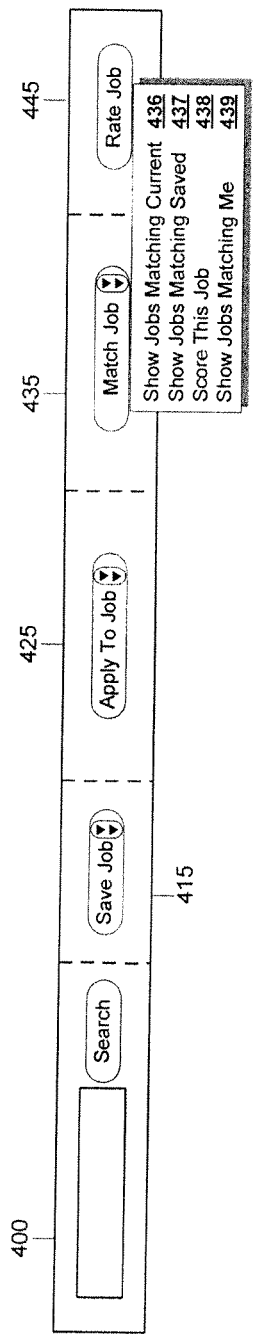
FIG. 4A discloses an embodiment of a job tracking extension in accordance with the present invention.

One implementation of the Job Listing Tracking Extension 150 may be a web browser toolbar. An implementation of a Job Listing Tracking Extension toolbar 400 is shown in FIG. 4A. In operation, the Job Listing Tracking Extension toolbar of FIG. 4A provides user accessible controls to implement job application tracking functions and retrieve information from the Job Application Tracking And Management Environment. For example, if the applicant encounters a web page containing a job listing that the applicant is interested in, the Save Job control 415 can be activated. Activating the Save Job control will cause the Job Listing Tracking Extension to transfer information about the job listing to the Job Tracking And Management Core where it is stored or to a shared data repository accessible by the Job Tracking And Management Core. In particular, the Job Tracking And Management Core might save the URL of the web page containing the job listing. In the alternative, or in addition, information about the job might be extracted from the web page and saved in a database accessible by Job Tracking And Management Core and the Job Tracking extension.

The Job Listing Tracking Extension can also retrieve information from the Job Tracking And Management Core for use in its host program (e.g., a web browser). For example, if the applicant discovers a listing for a job of interest while browsing, he or she can use the Apply To Job control 425, to initiate the application process. The Apply To Job control can display a menu with a number of different options for application purposes. For example, if the on-line job application has an on-line web form, selecting the Apply To Job option can use information from the Job Tracking And Management Core to auto-populate the web form. If the job listing provides an email address for application submissions, the Choose Resume And Apply option can open the applicant's email client and format an email with the applicant is cover letter content in the body of the email and the applicant's resume attached to the email. In the alternative, the Apply To Job control might generate a cover letter document for transmission to the prospective employer. The Apply To Job control can also be configured to provide a one-click apply feature. For example, if the applicant has provided sufficient information to the system and the currently viewed job listing is in a known format. The process could by configured to effectuate application with only one user action, such as clicking on an automatic apply button.

In some embodiments of the disclosed invention, the Job Listing Tracking Extension may also submit information to the Job Tracking And Management Core from its host program. For example, if the applicant is browsing a web site, particularly a web site listing jobs, the Job Listing Tracking Extension can communicate this information to the Job Tracking And Management Core, which may store the information and in a further embodiment, use it to modify the applicant's profile. For example, if an applicant frequently goes to a particular company's job site, that information could be sent from the Job Listing Tracking Extension to the Job Tracking And Management Core, which could indicate the applicant's interest in employment at the particular company.

The FIG. 4A embodiment of the Job Listing Tracking Extension also includes a Match control 435 that provides job listing search assistance actions. For example, in one embodiment, if the applicant discovers a job listing of interest, the Show Jobs Matching Current 436 option can be activated. In a further embodiment, the Show Jobs Matching Current may be provided to the user as a one-click function. In one embodiment, the Job Listing Tracking Extension will then activate processes to analyze the current page and extract relevant job description terms. The Job Listing Tracking Extension uses the extracted terms to initiate a search for similar jobs, the results of which are provided to the applicant, for example, jobs from the same employer, same area, same job description, or a combination of these. In a further embodiment, the identification of similar jobs can be enhanced if express categorization information is provided on the current page in a way that is easily manipulated by the Job Listing Tracking Extension. One such mechanism would be to format the data using an XML markup and associated schema that provides tags identifying the relevant information.

Another option provided by the Match control 435 in some embodiments of the disclosed invention is Show Jobs Matching Saved 437 option, which allows the applicant to find jobs similar to jobs previously saved using the Save Job control 415. The Job Listing Tracking Extension will then activate processes to analyze the plurality of saved jobs and extract the common and relevant job description terms. The Job Listing Tracking Extension uses the extracted terms to initiate a search for similar jobs, the results of which are provided to the applicant, by way of non-limiting example, jobs from the same area, jobs with the same skills and/or educational requirements, same job description, or a combination of these.

Figure 4B:
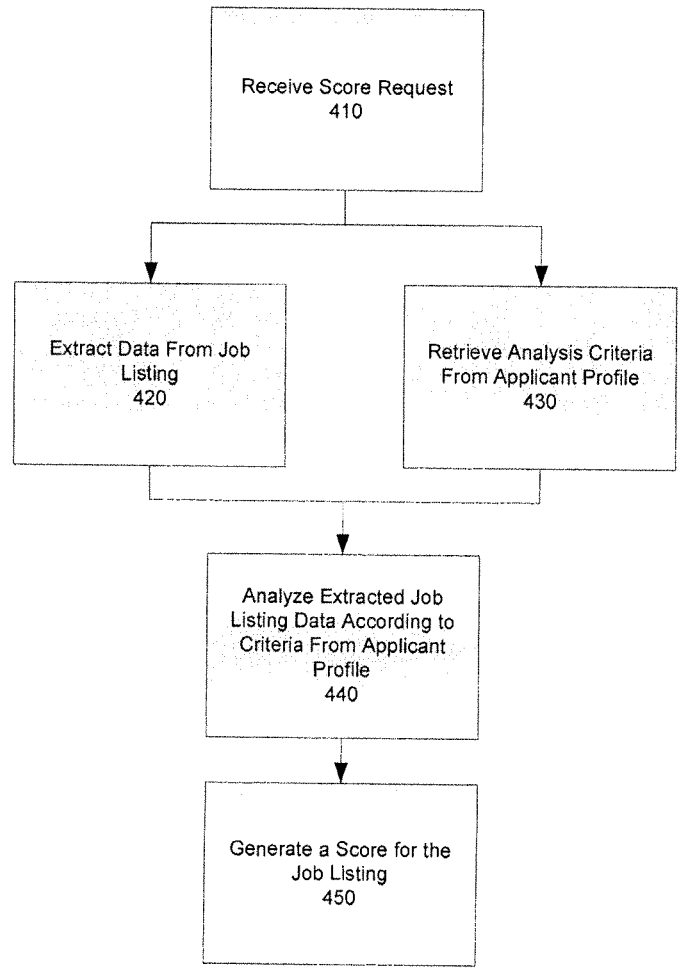
FIG. 4B discloses an overview of a scoring process for one embodiment of the disclosed invention.

In another embodiment the Match control 435 provides an option to Score This Job 438, which in some embodiments may be provided as a one-click function. In one embodiment, shown in FIG. 4B, when an applicant selects the Score This Job option, the Job Listing Tracking Extension and/or Job Tracking And Management Core receive(s) the score request 410, parses and extracts the job listing data on the current page 420 and retrieves analysis criteria from the applicant's profile 430. The Job Listing Tracking Extension and/or Job Tracking And Management Core analyzes and compares 440 the extracted job listing data to the criteria from the applicant's profile. For example, in the case of an online job listing, contents of the web page (e.g., HTML page) are parsed and the parsed contents of the job listing are compared to criteria from the applicant's profile and/or resume. The correspondence between the job listing and the applicant's profile can then be used to generate a score 450 (a number or other indicia) of the job's relative merits. For example, in one embodiment, if the job listing and the applicant's profile have matching data elements such as skills, education, location, experience and the like, such correspondence would be reflected in the score.

In one embodiment, the results of selecting Score This Job 438 option can be provided to the applicant via the Job Listing Tracking Extension toolbar 400, as a number or some other relative indicia of the job's suitability for the applicant (e.g., the job listing is an 86% match for the applicant). The applicant can score other job listings and use the resulting indicia to compare different jobs and/or further refine the applicant's profile. In some embodiments, the Job Tracking And Management Core may further enhance the process of creating the score by receiving, storing and analyzing the applicant's goals, criteria, and preferences. Some embodiments of the invention enhance the scoring process by analyzing aspects of an applicants browsing or surfing history, such as job listings viewed as well as companies sites, news sites and retailer sites visited. In one embodiment, a data entry correlation report related to an applicant may be utilized in the scoring process.

This information could then be provided to the Job Listing Tracking Extension and taken into account when performing the job scoring routine. In one embodiment, the scoring process is iterative and may be refined by receiving additional information and/or feedback from the applicant. For example, based on the applicant's interests, the applicant may raise or lower the provided score of a particular job, and this adjustment may then be incorporated when performing the job scoring routine. In terms of implementation, the actual job scoring processes could reside in the Job Tracking And Management Core with the Job Listing Tracking Extension passing the Job Tracking And Management Core the relevant data and the Job Tracking And Management Core providing the score back to the Job Listing Tracking Extension and/or storing for later reference by the applicant. The function could also be implemented on a remote server that processes the job scoring request.

Another option provided by the Match control 435 is Show Jobs Matching Me 439, shown in FIG. 4A. Like the Score This Job option, the Show Jobs Matching Me option uses information about the applicant indeed much of the information used may be identical. However, rather than using the applicants information to score a pre-determined job listing, the applicant's information is used to find job listings. In other words, this option finds high scoring jobs, and in one embodiment, jobs scoring over a certain threshold (e.g., jobs scoring 90 or more out of 100). The applicants information is used to create a search query or series of search queries that will locate job listings relevant to the applicant. In one embodiment, the Show Jobs Matching Me option is provided to the user as a one-click function. The Show Jobs Matching Me 439 option can cause searches to be performed upon multiple different job listing databases and/or via a general internet search. The search function can be implemented by either the Job Listing Tracking Extension or the Job Tracking And Management Core.

The FIG. 4A embodiment of the Job Listing Tracking Extension also includes a Rate Job control 445 that facilitates user feedback and response actions. For example, if an applicant discovers a job listing of interest, the Rate Job control 445 option can be activated allowing the applicant to submit feedback in the form of some relative indicia, such as a "star" rating, indicating the applicant's interest in the listing and/or particular aspects of the listing. The applicant can rate multiple job listings and use the resulting indicia to compare different jobs and in a further embodiment, the Job Tracking And Management Core may receive, store and analyze the applicant's ratings of job listings to further refine the applicant's profile. In one embodiment, the job listing ratings provided by an applicant may be incorporated in the generation of an associated data entry correlation report.

Figure 4C:
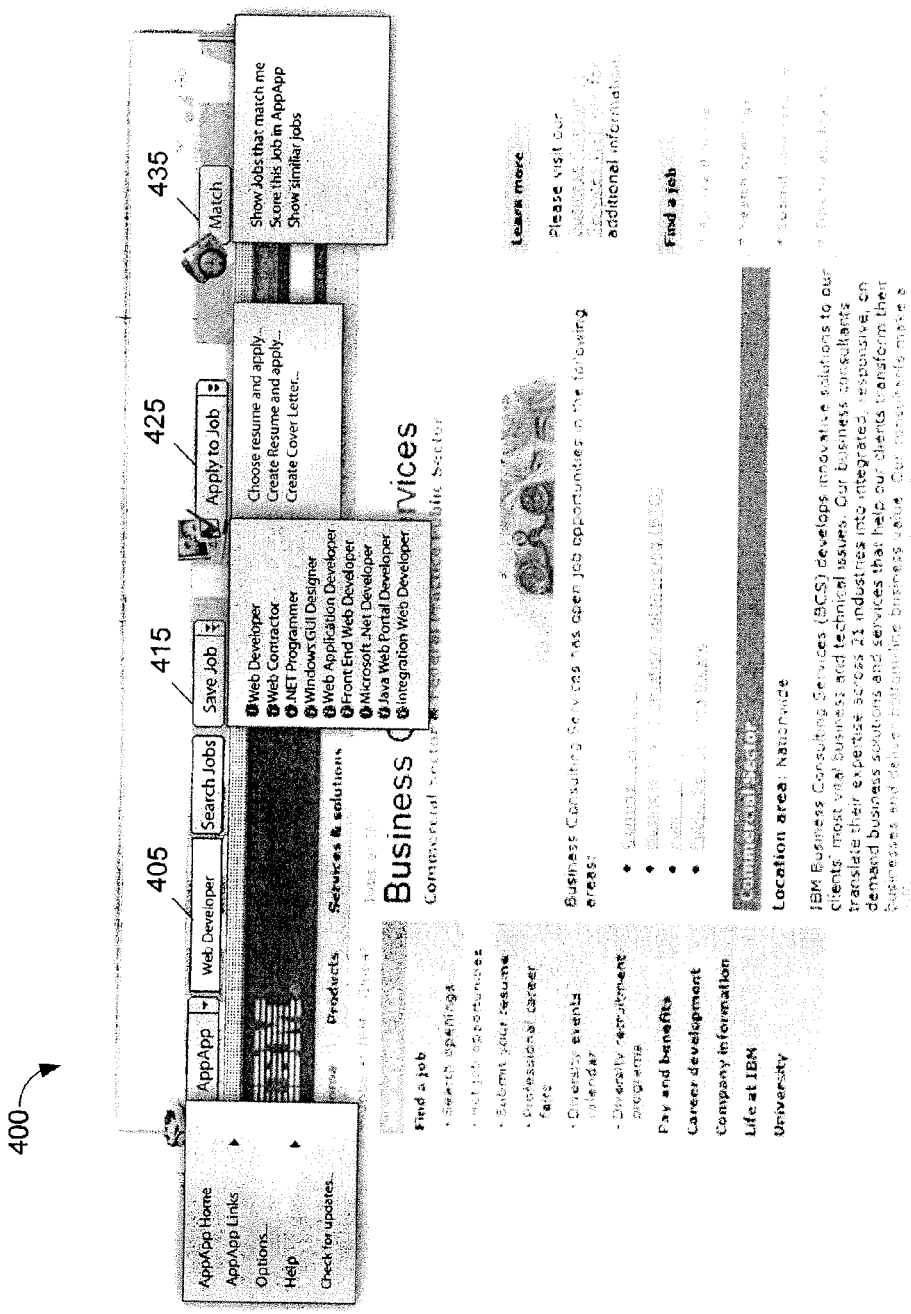
FIG. 4C discloses a particular implementation of a job tracking extension toolbar.

FIG. 4C shows a particular implementation of a Job Tracking And Management Extension as a web browser toolbar 400. This implementation includes a key word search jobs interface 405, a save jobs interface 415, an apply to job interface 425 and a match job interface 435. As shown in the figure, the save job interface 415 provides a drop down list of previously saved jobs. Also, the apply to job interface 425 allows the applicant to choose a resume and apply to a job. The resumes that the applicant chooses could be stored locally on the applicant's machine or could be stored on a network server. The create apply to job interface also includes a create resume and create cover letter options, which allow the applicant to create resumes and cover letters tailored to the job for which they are applying. The match user interface 435 allows the applicant to perform a search for jobs matching the applicant, score the job currently being viewed and search jobs similar to the current job.

In another embodiment of the disclosed invention, the Job Listing Tracking Extension and/or the Job Tracking And Management Core may continue to search for matching job listings and notify an applicant if a job listing is found that is especially well matched to the applicant (e.g., the job listing represents the applicant's ideal job). Similarly, an applicant may be notified if a particular listing has an especially high score according to the applicant's profile. In some embodiments the system keeps searching for matching job listings for the applicant even if the applicant has stopped actively looking for a job. In one embodiment, the notification may be provided to an applicant regardless of whether or not the applicant is currently searching for a job. For example, take an applicant who had previously searched for jobs but was unable to find a job listing that was a perfect match. The system could continue searching for matching listings, and if at some future time the system found a job listing that was especially well-suited to the applicant and/or the applicant's profile, the system would notify the applicant that a good match had been found.

Figure 5A:
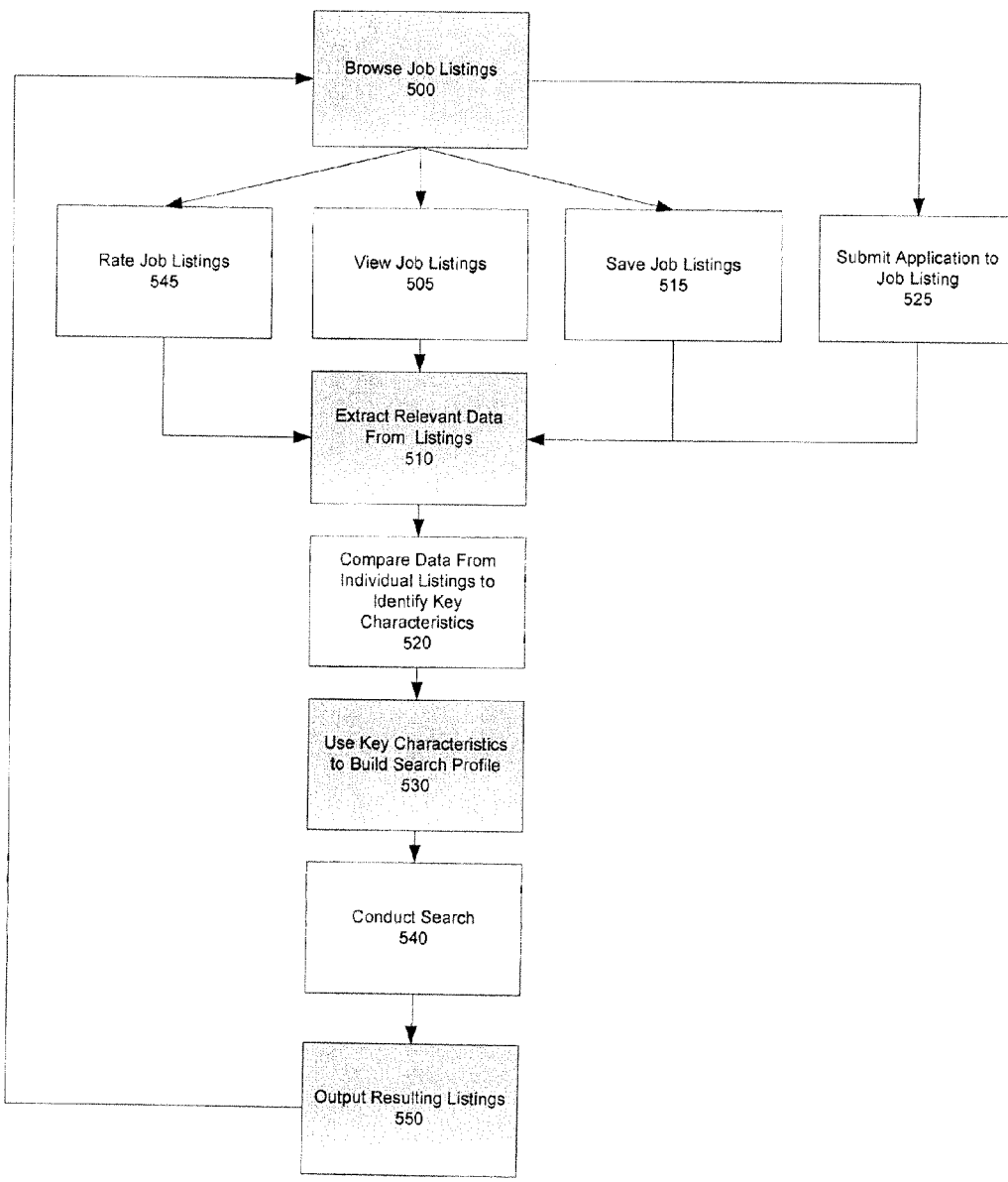
FIG. 5A discloses a flow diagram for the listing match search of one embodiment of the present invention.
Figure 5B:
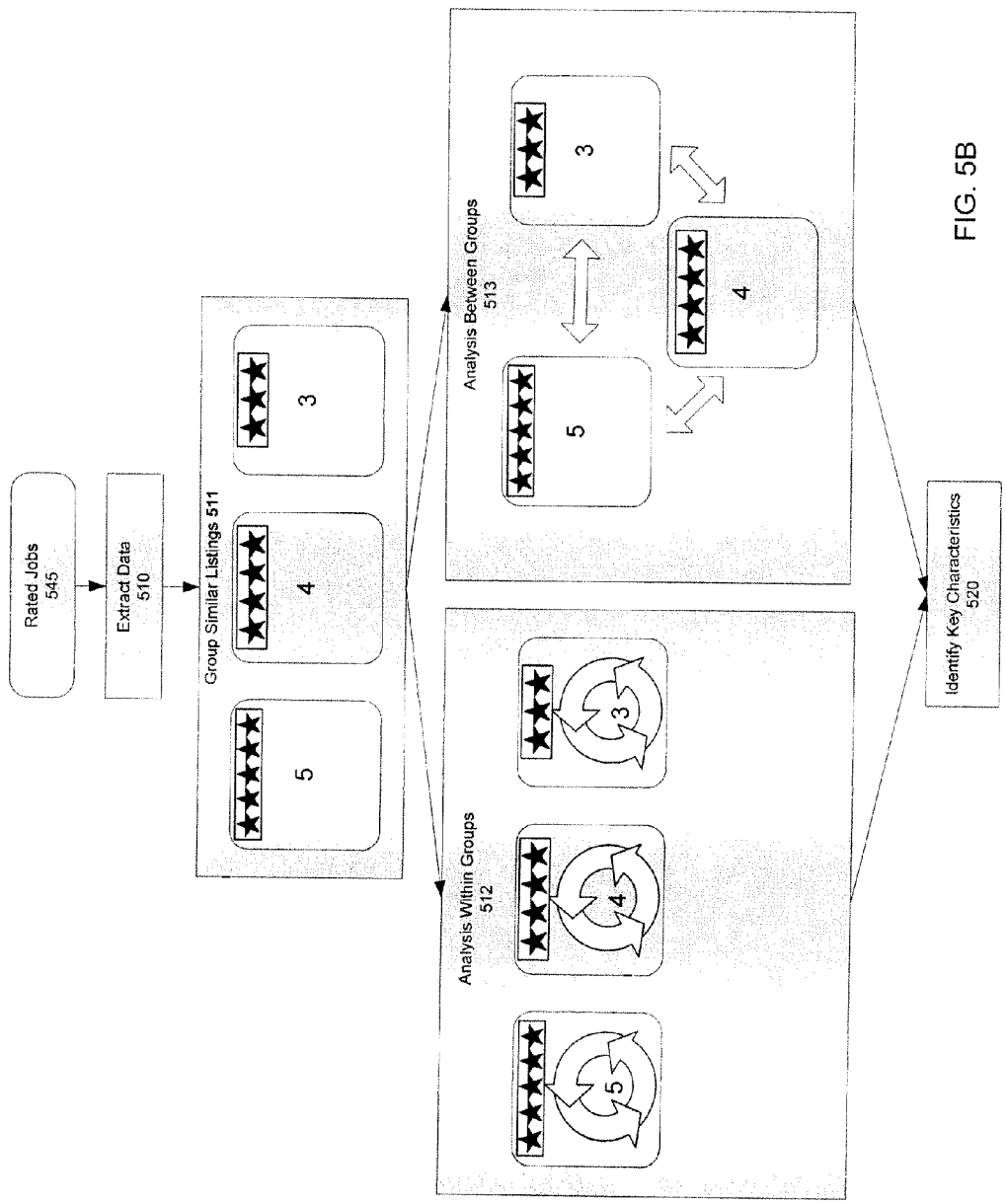
FIG. 5B discloses an overview of an analysis aspect of one embodiment of the disclosed invention.

FIGS. 5A-5B provide flow diagrams representing overviews of methods for dynamically providing matched job listings to an applicant in one embodiment of the disclosed invention. In some embodiments, the methods disclosed may be implemented on a processor by the Job Listing Tracking Extension 150 and/or the Job Tracking And Management Core 110, and in further embodiments may utilize the Job Listing Tracking Extension toolbar 400 as disclosed in the above discussion of FIG. 4A. In one embodiment, shown in FIG. 5A, via the described method an applicant may browse job listings 500 and view 505, save 515, rate 545 and/or submit an application 525 to job listing. When an applicant views a job listing 505, the listing, key terms from the listing, and the amount of time it was viewed by the applicant are retained. In a further embodiment, when saving 515, rating 545 and/or submitting an application 525 to job listing, the applicant may utilize the Save Job control 415, Rate Job control 435, and Apply To Job control 425 respectively, as disclosed in FIG. 4A.

Each user initiated action yields a respective action group of listings from which relevant data may be extracted 510. The extracted data from individual listings may be compared with extracted data from other listings in each group and/or, across groups, to identify key common/distinguishing job listing characteristics 520. In a further embodiment, comparisons within and across sub-groupings, such as rated job listings sub-grouped according to ratings or viewed job listings sub-grouped according to view times, may be utilized in identifying key characteristics. The key characteristics identified may then be used to build a search profile 530 from which job listings searches are conducted 540. The job listings resulting from the searches 550 may then be presented to the applicant for browsing 500, and in a further embodiment, the process repeated to provide the applicant with progressively more relevant job listings. In a further embodiment, the method disclosed is used to dynamically update the job listings browsed by an applicant.

FIG. 5B provides an overview of the group comparison process for one embodiment of the invention. Rated job listings 545 for an applicant may have the relevant data extracted 510, wherein the extracted data is associated with the respective individual job listing. The rated job listings and associated data are grouped according to applicant designated rating 511: Group 5 for job listing the applicant has given a 5 star rating, Group 4 for job listings the applicant has given a 4 star rating, and Group 3 for job listings the applicant has given a 3 star rating. The extracted data from individual listings is then analyzed within each group 512 and/or between groups 513 in order to identify key characteristics 520, which may be used to build a search profile. Other embodiments of the disclosed invention may use the same or similar method in processing groups and/or subgroups of job listings.

Figure 6A:
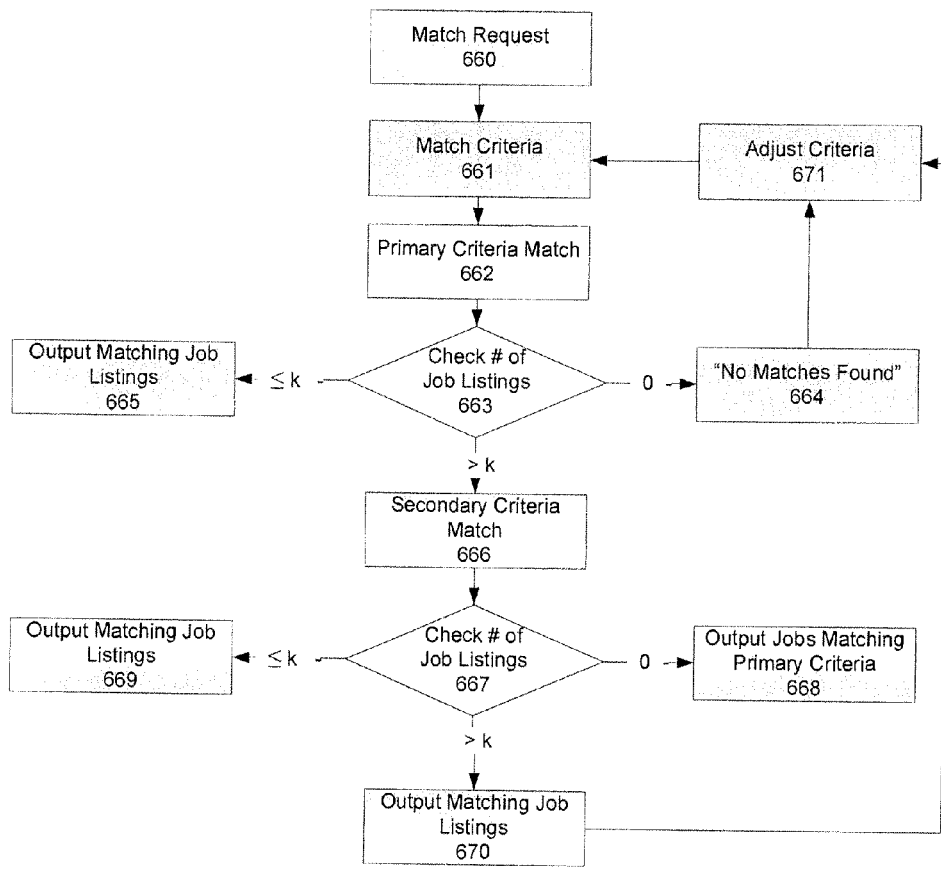
FIGS. 6A, 6B and 6C disclose logic flow diagrams of the results processing match aspect for some embodiments of the present invention.
Figure 6B:
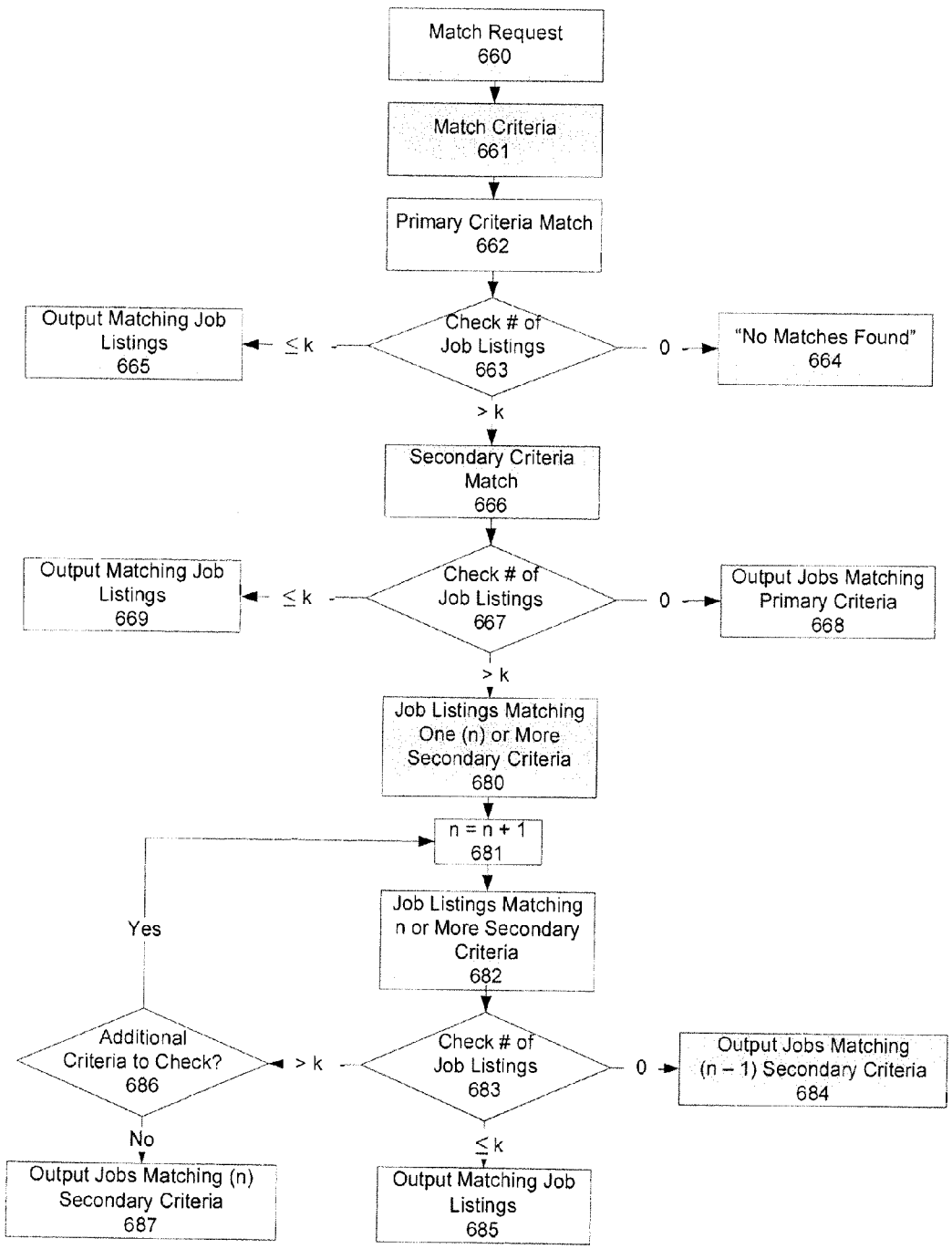
Figure 6C:
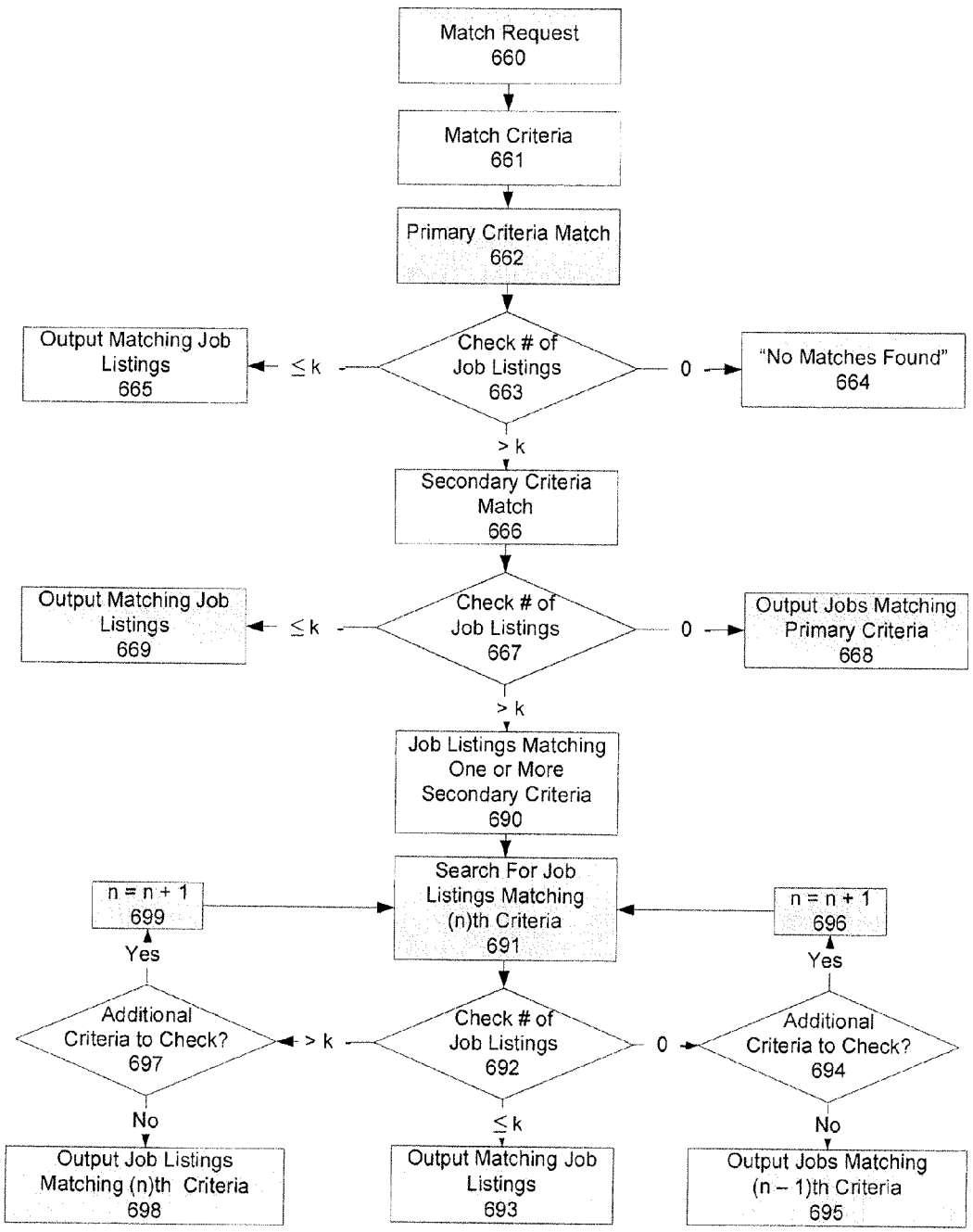

FIGS. 6A, 6B and 6C illustrate flow diagrams for the match screening aspect of the matching process associated with some embodiments of the invention. Certain embodiments of the disclosed invention may use these or similar processes in scoring jobs for an applicant. The input for the match screening process is a Match request 660 for a plurality of job listings. The Match criteria 661 for the job search may come from a number of sources including but not limited to the following: analysis of the applicant's profile, applicant's resume 120, a particular job listing selected by the applicant, a data entry correlation report, analysis of the plurality of job listings saved by the applicant, job listings applied to by the applicant, analysis of the applicants browsing history, applicant feedback and/or the like.

Next an iterative match screening of job listings is performed. The queries discussed can be performed through a variety of methods. In some embodiments, the iterative match screening begins with a primary criteria matching 662 of the job listings to obtain a first pool of potential matches for the applicant. The primary criteria match screening 662 uses match criteria that are essential to finding an appropriate match for the applicant, such as skills and/or qualifications required. In some embodiments, required skills and qualifications are fundamental criteria and provide a solution for narrowing down the list of jobs (i.e., the job at least requires skills and qualifications similar to the applicant's skills and qualifications).

In one embodiment, aspects of a data entry correlation report related to an applicant may be included in the primary criteria and/or used in selecting primary criteria. In one embodiment, the applicant may also be allowed to indicate required criteria. For example, if an applicant is interested in finding a job with a particular schedule, salary and/or location, the applicant might designate one of these parameters as required criteria. Any such identified required criteria would be added to the primary criteria matching 662.

The results of the primary criteria matching 662 are passed to a decision block 663 where a check is made to determine if any matching job listings were identified. If no job listings meeting the primary criteria were found, a "no matches found" error 664 is generated and communicated. The criteria may then be adjusted 671 to update the primary match criteria 661 for the screen or start a new Match request 660, and in a further embodiment, update the search criteria. In a further embodiment, the match screen and/or search criteria may be saved and the search be re-run at a later date when the job listings information may have been supplemented or modified. If the matching job listings are only a small number of entries (i.e., the number of entries is ≤k, where k may be set by the applicant, the system, etc.), the information for those job listings is output 665 to the applicant. If the matching job listings has many entries (number of entries>k), the process continues on to the secondary criteria match screening.

A screen of the remaining job listings is performed to determine which job listings meet one or more of the secondary criteria 666. The results of this match screen are passed to a decision block 667. If none of the jobs meet any of the secondary criteria, the job listings meeting the primary criteria may be reported to the applicant 668. If only a small number of job listings meet any of the secondary criteria, the information for those job listings is output 669 to the applicant. If many job listings meet one or more of the secondary criteria further refinement of the screen can be performed as follows.

In one embodiment, all job listings meeting at least a specified number of secondary criteria can then be presented to the applicant for review 670. This approach works particularly well when the secondary criteria are not ordered in terms of importance. In other words, if there are a number of secondary criteria without an indication that some of those criteria are more preferred than others, it might be best to give the applicant the information for all the job listings that meet their primary criteria plus the specified number of their secondary criteria.

The applicant can then review the job listings to see how each meet their secondary criteria and choose whichever they feel is the best match. In one embodiment, the applicant may rate some or all of the provided job listings and/or select job listings that the applicant feels are a good match and in a further embodiment, the rated and/or selected job listings may be used to refine or adjust criteria 671 and update the match criteria 661 used to select job listings for the applicant. For example, if the applicant gives a low rating for a particular employer or type of job, the criteria would be modified to screen against the particular employer or job type. In one embodiment, an applicant's screen criteria and/or modified screen criteria may be reflected in subsequent data entry correlation reports for an applicant.

The approach described above could be refined, as shown in FIG. 6B, by iterating over the job listings meeting one or more criteria to find the jobs meeting the most categories of secondary criteria. This approach begins with the list of jobs meeting one or more of the applicant's secondary criteria 680. To determine if any of the jobs meet more than one criteria the value n, starting at one, is incremented by adding one to itself 681. The list of jobs 680 is screened for jobs that meet n criteria 682 (i.e., two) during the first iteration of the process. The number of jobs remaining after this matching is checked 683. If no job listings remain, the list of jobs meeting n−1 criteria is output 684. If only a small number of job listings remain, those jobs' information is output 685. If more than a small number of job listings remain, a determination is made to decide whether there are still more secondary applicant criteria to check 686. If there are not, the list of jobs meeting n criteria is output 687. If there are secondary criteria remaining, the process increments n again 681 and the filtering process continues.

The process as described above will result in job listings that meet the highest number of the applicant's criteria. In other words, if twenty jobs meet any five of the applicant's criteria, but none of the jobs meet six of the criteria, this match process will identify those twenty job listings. This procedure, however, does not value any of the secondary criteria more than the rest. Accordingly, if some of the applicant's secondary criteria are more important than others a different process might be advisable.

FIG. 6C discloses a flow diagram for matching job listings such that they are identified according to the importance of the secondary criteria. This flow requires the secondary criteria to be ordered as to their importance, with the most important criteria listed first, the second most important second and so on. This ordering can either be identified by the applicant, the Job Listing Tracking Extension 150, the Job Tracking And Management Core 110, be inherently programmed into the system, generated using other aspects of the disclosed invention, etc. For example, if the criteria for the search were generated by analysis of the job listings saved by the applicant using the save jobs interface 415, the criteria could be ordered according to the which criteria was most common to the saved job listings (e.g., if all the jobs require a particular skill, that skill would be the first listed criteria; if most of the jobs were in a certain location, that would be a subsequently listed criteria). In another embodiment, the criteria for the search for a particular applicant may be identified and/or ordered according to a data entry correlation report corresponding to the particular applicant.

The process begins with job listings meeting one or more of the secondary criteria 690. These are screened for job listings matching the (n)th most important secondary criteria 691, i.e., the first most important criteria in the first iteration of the process, etc. The results derived from the match screen are checked to determine the number of matching job listings 692. If only a small number of job listings remain after the matching, those job listings are output 693. If no job listings remain after the matching, a determination is made to discover whether there are other criteria to check 694. If not, the job listings found after the screen for matches for the (n−1)th criteria are output 695. If other criteria remain to be screened, the value of n is incremented 696. The job listings remaining after the previous matching are now screened again at 691 to determine if any of those job listings match the new (n)th criteria and the iterative process continues. If multiple job listings are found to meet the (n)th criteria at decision 692, a determination 697 is made to find whether there are any criteria remaining to be screened. If no criteria remain, the job listings meeting the (n)th criteria are output 698. If other criteria remain to be screened, the value of n is incremented 699. The job listings remaining after the previous matching are now screened again at 691 to determine if any of those job listings match the new (n)th criteria and the iterative process continues.

Alternatively, the matching systems disclosed in FIGS. 6A, 6B and 6C could be combined. For example, a hybrid approach might use the 6B approach to narrow the field of job listings to job listings meeting at least three secondary criteria and then use the 6C approach to test for secondary criteria in a preferred order. In another embodiment, primary criteria are reused as secondary criteria. For example, it might be advisable to use skills and/or responsibilities required as primary criteria to exclude job listings outside the applicant's interest area. Then after narrowing down job listings based upon a number of secondary criteria it might be beneficial to reuse the skills and/or responsibilities required to find the job listings best suited to the applicant.

In addition to screening for matching job listings, in some embodiments of the disclosed invention the above methods may be similarly utilized in scoring job listings for an applicant. For example, the more criteria a job listing met, the higher the relative score of the job listing would be. As discussed above, the scoring could similarly incorporate different priority levels and/or weights for different criteria in calculating a job listing's score. Also, some level of iterative screening may be implemented as part of the search process.

Job listings saved and/or applied for by the applicant using the Job Listing Tracking Extension are recorded by the Job Tracking And Management Core. The Job Tracking And Management Core allows the applicant to access this information. For example, the Job Tracking And Management Core can provide a history screen listing the applicant's saved and applied for jobs, along with relevant information about each saved job. For example, the embodiment of FIG. 7A lists job title 701, company 702, location 703, the date the job was applied for 704, the number of correspondence between the applicant and the employer 705, the status of the application 706, and the job's score 707. The date applied for field shows the date applications were provided to the employer note that listings without dates indicate saved job listings that have not yet been applied for. The correspondence field of the history report can act as a control that when activated displays the history of correspondence between the applicant and the employer. The job application history screen might also provide a mechanism for highlighting applications in which some activity has occurred.

Figure 7B:
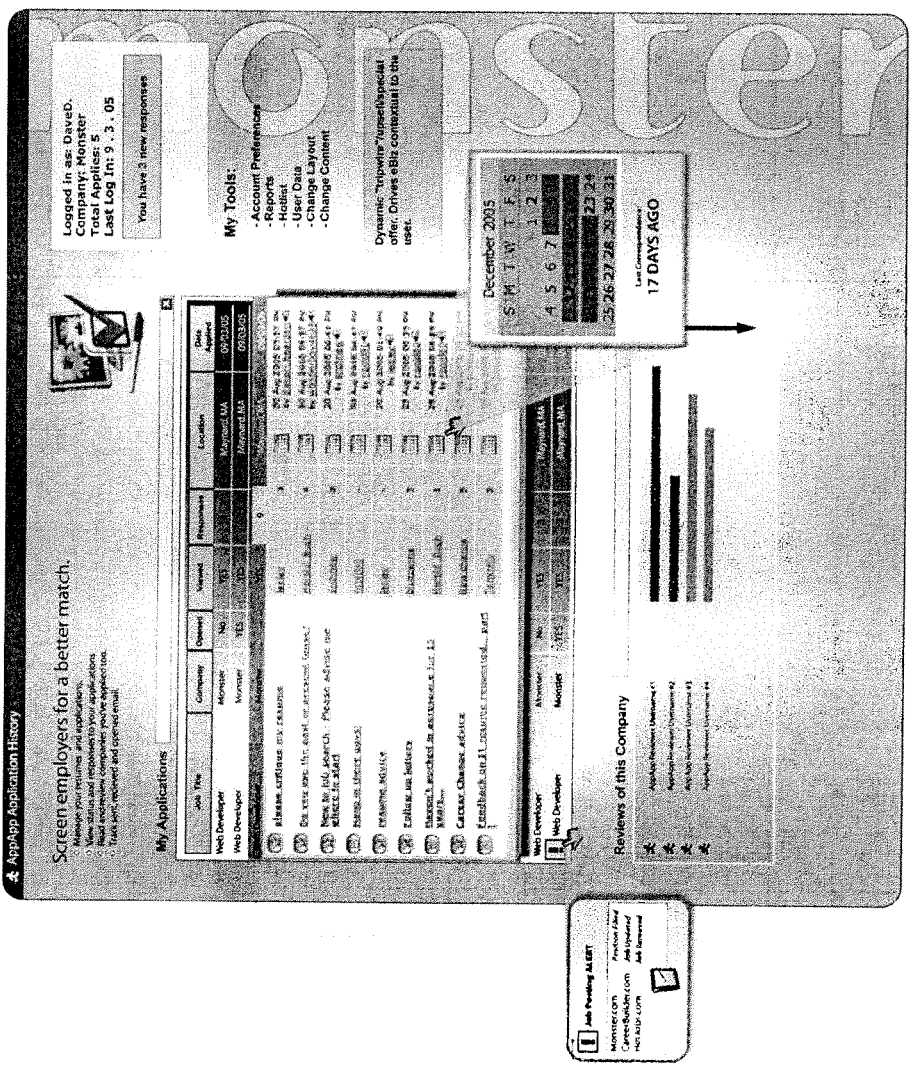
FIG. 7B discloses a particular implementation of an application history screen.

In one embodiment, the applicant may rate the stored jobs according to their preferences, as shown in FIG. 7C. In one embodiment, the job ratings may be incorporated into the applicant's profile and/or utilized when matching and/or scoring additional jobs. In a further embodiment, the applicant may rate individual aspects of a stored job, such as the job title 701, company 702, and/or location 703. In some embodiments, the ratings of the individual aspects may be associated with or incorporated into the applicant's profile and utilized when matching and/or scoring additional jobs.

Figure 8A:
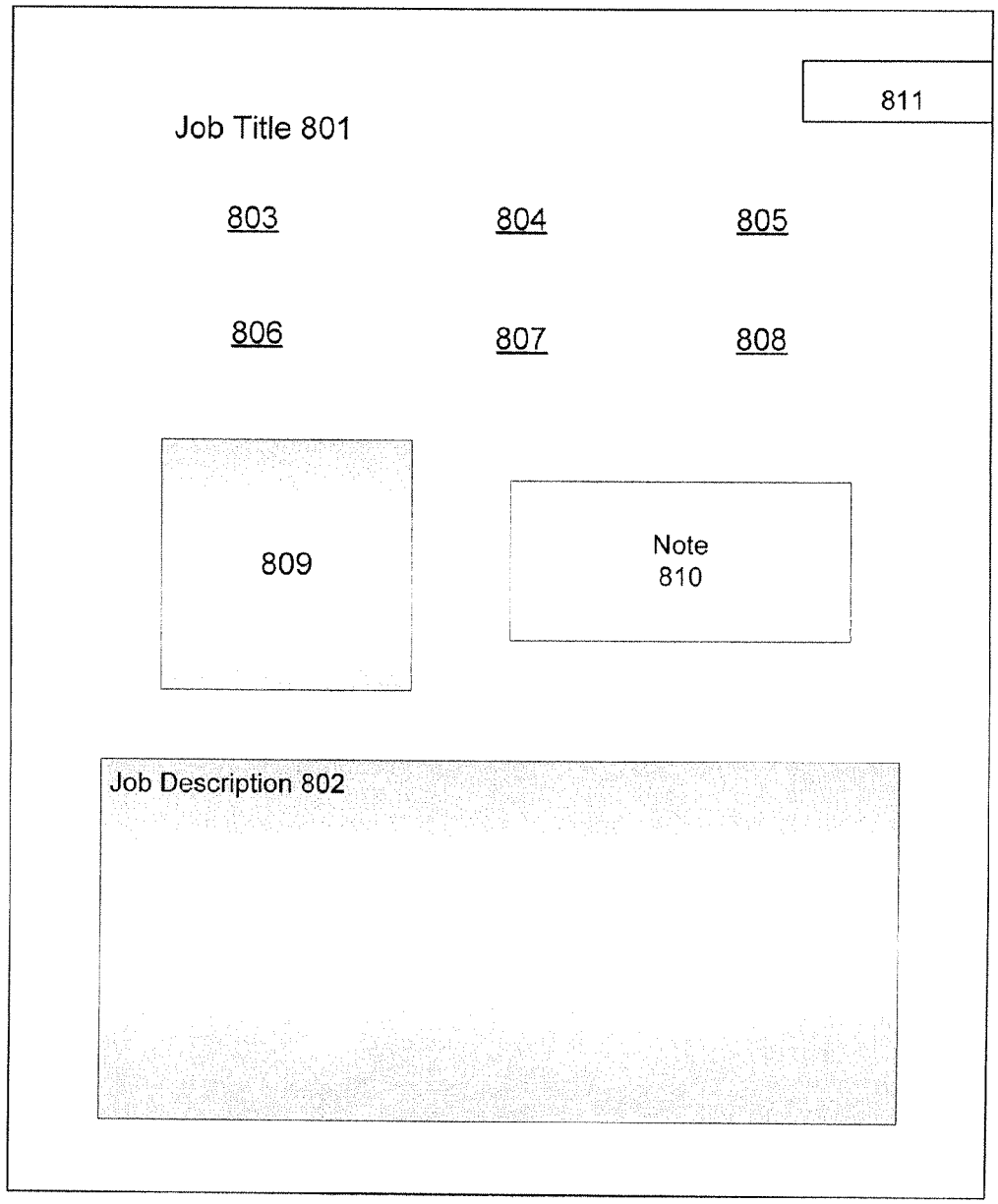
FIG. 8A discloses an embodiment of a job view screen in accordance with the present invention.

The Job Tracking And Management Core can also provide a Job View screen that provides detailed information about the applicant's saved jobs. This screen could, for example, be accessed by selecting a job from the history screen. One embodiment of a Job View screen is shown in FIG. 8A. The Job View screen provides details about a particular job. The job title 801 and detailed description of the job 802 can be provided, as well as, the company 803, location 804, job type 805 (full-time, part-time, freelance, etc.), job category 806, work experience required 807, and education level required 808. The Job View screen might also display meta-data about the job listing 809, such as, how many times the same job has been posted in the last year or how many days the job listing has been active. The Job View screen may also include a note entry area 810 for use by the applicant and controls to allow the applicant to access data about the employer and find other similar jobs.

As it is advantageous for the applicant to know whether the same job is listed elsewhere, the Job View screen can also include controls identifying other web sites containing the same job listing 811, which also allow the applicant to view the job listing as it appears on that site. This could be accomplished by integrating a browser window showing the job listing as it appears on the various listing sites or by retrieving and reformatting the information from the various listing sites. The Job Tracking And Management Core can independently search out these duplicate listings or they can be identified through the applicant's search process, such the Job Tracking And Management Core recognizes when to retrieved jobs are in fact identical.

Figure 8B:
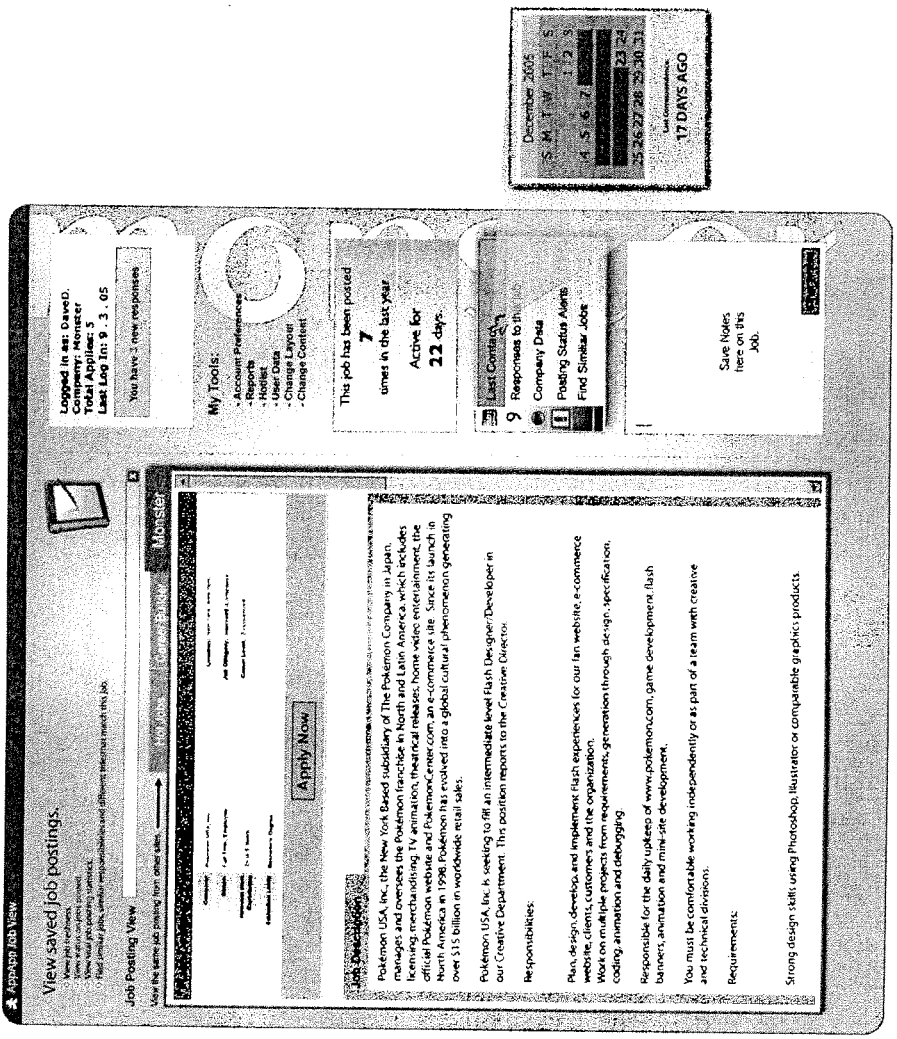
FIG. 8B discloses a particular implementation of a job view screen.

FIG. 8B shows a particular implementation of a Job View screen. This particular Job View screen is implemented as part of a Job Tracking And Management Core embodied as stand-alone application. As can be seen, other potential features of the toolbar are shown in the Figure.

Figure 8C:
FIG. 8C discloses a further embodiment of a job view screen in accordance with the present invention.

Additionally, as with the job history screen, in some embodiments the Job View Screen may also allow the applicant to rate aspects of the job displayed on the Job View Screen, as shown in FIG. 8C. Aspects of the job listing such as the detailed description of the job 802, the company 803, location 804, qualifications (including work experience 807 and education 808), starting salary 812 and benefits 813. In a further embodiment, certain sub-categories of the provided information, such as certain aspects of the detailed description of the job 802 may also be rated. For example, if a job description includes a list of technical skills desired, an applicant might give one desired technical skill a high rating (indicating that it is a skill the applicant is interested and/or proficient in), but give another desired technical skill desired a low rating (indicating the applicant is not interested in performing and/or lacks proficiency in that skill). The ratings may be associated with and/or incorporated into the applicant's profile and utilized when matching and/or scoring additional jobs.

Figure 9A:
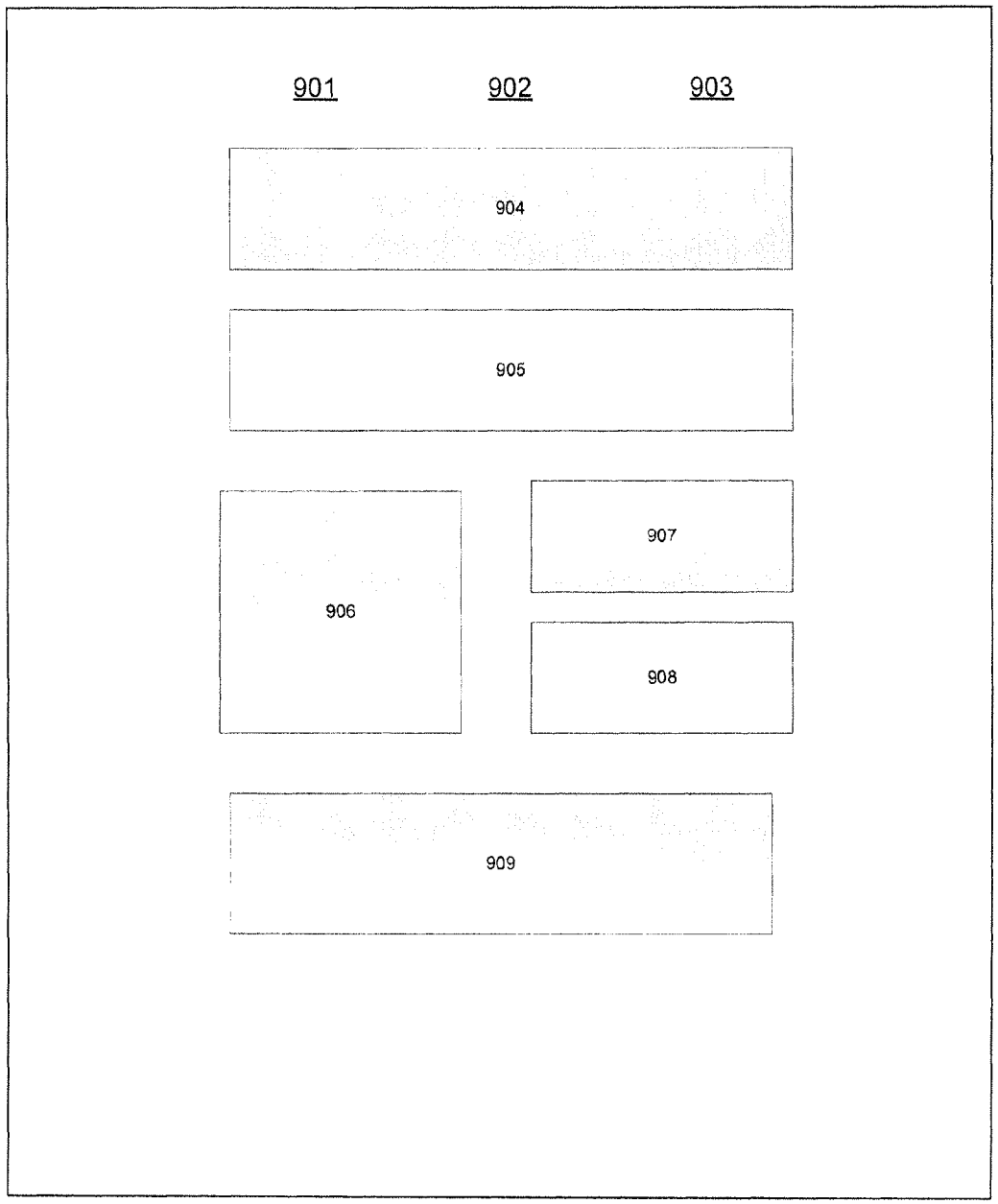
FIG. 9A discloses an embodiment of a company metrics screen in accordance with the present invention.

The Job Tracking And Management Core 110 can also provide a Company Metrics screen such as is shown in FIG. 9A. The Company Metrics screen will allow the applicant to research employers and, in a further embodiment, allow the applicant to rate employers. The Company Metrics screen can include the company name 901, the number of jobs posted by the employer in the last year 902, the average amount of time the employer's job listings stay open 903, other applicant's reviews of the employer and its hiring process 904, the top jobs posted by the employer 905, the most common locations of jobs posted by the employer 906, links to information about the employer's industry 907, and seasonal hiring patterns for the employer 908. Like the Job View the Company Metrics screen might also include an area for entering and saving notes made by the applicant 909. In some embodiments, the Company Metrics screen may also allow the applicant to rate each company as well as particular aspects of the company. The applicant's ratings may be stored and/or incorporated into the applicant's profile, and may further be utilized when matching and/or scoring additional jobs.

Figure 9B:
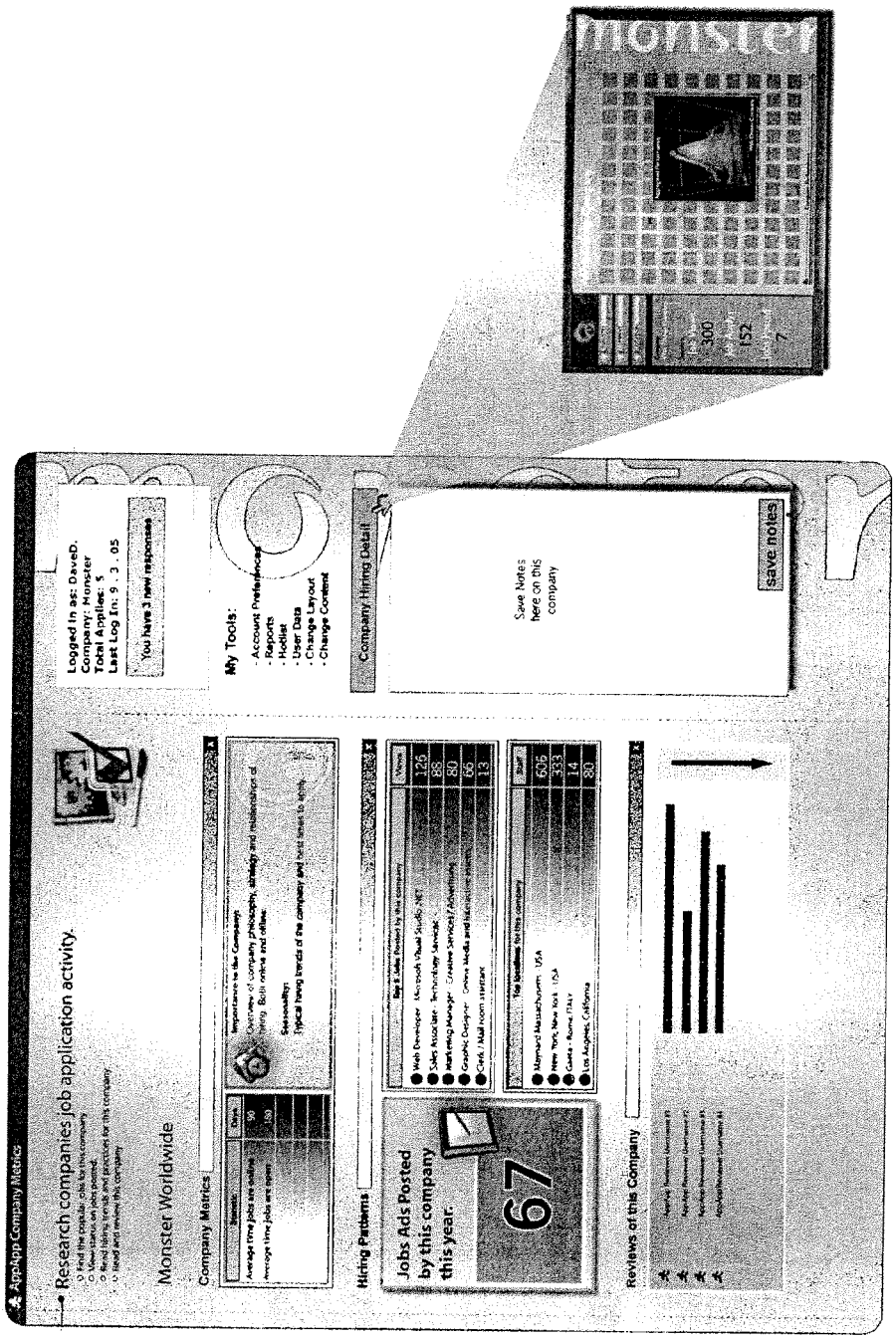
FIG. 9B discloses a particular implementation of a company metrics screen.

FIG. 9B shows a particular implementation of a company metrics screen. A system user may access the company metrics module of the system in order to conduct research on a company of interest. The module may be populated with additional corporate information supplied by the company, extracted from corporate documents and/or provided by other system users. This particular company metrics screen is implemented as part of a Job Tracking And Management Core embodied as stand-alone application. As can be seen, other potential features of the toolbar are shown in the Figure.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

The invention claimed is:

1. A processor-implemented method, comprising:
retrieving, via a processor, user profile data;
extracting base data entry metrics from the user profile data;
retrieving user correlation parameters based on the extracted base data entry metrics;
determining a search profile based on the user profile data, the base data entry metrics and the user correlation parameters;
searching job listings with the search profile to determine at least one job listing relevant to the user;
displaying the at least one job listing relevant to the user;
receiving, from the user, feedback about the displayed at least one job listing, said feedback not including information regarding a job listing to which said user is applying;
comparing said user feedback with an aggregated feedback metric to identify distinguishing job listing characteristics;
updating the search profile based on the feedback and the identified distinguishing characteristics;
searching job listings with the updated search profile; and
displaying at least one new job listing based on the feedback and the updated search profile.

2. The method of claim 1 wherein key terms are entered by the user and stored in the user profile data.

3. The method of claim 1, further comprising:
determining user-specific historical information;
updating the search profile for the user based on the historical information;
searching job listings with the updated search profile; and
displaying at least one new job listing based on the historical data and the updated search profile.

4. The method of claim 3, wherein the historical data is comprised of at least one of: previous search data, job listing views data, job listing response data, job listing application data, saved job listing data, web site viewing data, and web search history data.

5. The method of claim 1, wherein the user profile data comprises information on a web site.

6. The method of claim 1, wherein the user profile data comprises information on a user resume.

7. The method of claim 1, further comprising:
receiving an indication from a user to apply for one of the at least one job listing; and
submitting a user resume to the job listing.

8. The method of claim 7 wherein the user resume is automatically generated based on the user profile data.

9. The method of claim 7 wherein the user resume is uploaded by the user.

10. The method of claim 1, further comprising associating the at least one job listing and the at least one new job listing with the user profile data.

11. A system, comprising:
a memory;
a processor disposed in communication with said memory, and configured to issue a plurality of processing instructions stored in the memory, wherein the processor issues instructions to:
retrieve user profile data;
extract base data entry metrics from the user profile data;
retrieve user correlation parameters based on the extracted base data entry metrics;
determine a search profile based on the user correlation parameters and the base data entry metrics;
search job listings with the search profile to determine at least one job listing relevant to the user;
display the at least one job listing relevant to the user,
receive, from the user, feedback about the displayed at least one job listing, said feedback not including information regarding a job listing to which said user is applying;
compare said user feedback with an aggregated feedback metric to identify distinguishing job listing characteristics;
update the search profile based on the feedback and the identified distinguishing characteristics;
search job listings with the updated search profile; and
display at least one new job listing based on the feedback and the updated search profile.

12. The system of claim 11 wherein key terms are entered by the user and stored in the user profile data.

13. The system of claim 11, further comprising instructions to:
determine user-specific historical information;
update the search profile for the user based on the historical information;
search job listings with the updated search profile; and display at least one new job listing based on the historical data and the updated search profile.

14. The system of claim 13, wherein the historical data is comprised of at least one of: previous search data, job listing views data, job listing response data, job listing application data, saved job listing data, web site viewing data, and web search history data.

15. The system of claim 11, wherein the user profile data comprises information on a web site.

16. The system of claim 11, wherein the user profile data comprises information on a user resume.

17. The system of claim 11, further comprising instructions to:
receive an indication from a user to apply for one of the at least one job listing; and
submit a user resume to the job listing.

18. The system of claim 17 wherein the user resume is automatically generated based on the user profile data.

19. The system of claim 17 wherein the user resume is uploaded by the user.

20. The system of claim 11, further comprising instructions to:
receive, from the user, feedback about the displayed at least one job listing;
update the search profile for the user based on the feedback;
search job listings with the updated search profile; and
display at least one new job listing based on the feedback and the updated search profile.

21. The system of claim 11, further comprising instructions to associate the at least one job listing with the user profile data.

22. A processor-implemented method, comprising:
retrieving, via a processor, user profile data;
extracting base data entry metrics from the user profile data;
retrieving user correlation parameters based on the extracted base data entry metrics;
determining a search profile based on the user profile data, the base data entry metrics and the user correlation parameters;
searching job listings with the search profile to determine at least one job listing relevant to the user;
displaying the at least one job listing relevant to the user;
receiving, from the user, feedback about the displayed at least one job listing, said feedback including feedback information in addition to a job listing to which the user is applying;
compare said user feedback with an aggregated feedback metric to identify distinguishing job listing characteristics;
update the search profile based on the feedback and the identified distinguishing characteristics;
searching job listings with the updated search profile; and
displaying at least one new job listing based on the feedback and the updated search profile.

23. The method of claim 22, wherein the feedback information is based on user's employment interests including at least user base data entries, correlation parameters, and user feedback ratings.

24. A system, comprising:
a memory;
a processor disposed in communication with said memory, and configured to issue a plurality of processing instructions stored in the memory, wherein the processor issues instructions to:
retrieve user profile data;
extract base data entry metrics from the user profile data;
retrieve user correlation parameters based on the extracted base data entry metrics;
determine a search profile based on the user correlation parameters and the base data entry metrics;
search job listings with the search profile to determine at least one job listing relevant to the user;
display the at least one job listing relevant to the user;
receive, from the user, feedback about the displayed at least one job listing, said feedback including feedback information in addition to a job listing to which the user is applying;
compare said user feedback with an aggregated feedback metric to identify distinguishing job listing characteristics;
update the search profile based on the feedback and the identified distinguishing characteristics;
search job listings with the updated search profile; and
display at least one new job listing based on the feedback and the updated search profile.

* * * * *